United States Patent
Miller et al.

(10) Patent No.: US 6,192,410 B1
(45) Date of Patent: Feb. 20, 2001

(54) METHODS AND STRUCTURES FOR ROBUST, RELIABLE FILE EXCHANGE BETWEEN SECURED SYSTEMS

(75) Inventors: Christopher S. Miller; Jeffrey D. Alley, both of Ft. Collins, CO (US); Thomas Titze, Nufringen (DE)

(73) Assignee: Hewlett-Packard Company, Palo Alto, CA (US)

( * ) Notice: Under 35 U.S.C. 154(b), the term of this patent shall be extended for 0 days.

(21) Appl. No.: 09/110,218

(22) Filed: Jul. 6, 1998

(51) Int. Cl.[7] .................. G06F 13/14; G06F 13/38; G06F 13/372
(52) U.S. Cl. .................. 709/232; 709/224; 709/229; 379/93.07; 370/352
(58) Field of Search ............... 370/382, 394, 370/379, 397, 389, 352, 387, 392; 713/181, 200, 201, 202, 167, 153; 380/273, 277; 709/223, 214, 229, 224, 232; 326/8; 395/186; 342/188.01; 711/148, 147, 154; 379/144, 93.07, 90.01; 707/3, 9, 10

(56) References Cited

U.S. PATENT DOCUMENTS

| 5,185,795 | 2/1993 | Bright ................... 713/181 |
| 5,222,061 | 6/1993 | Doshi et al. ............... 370/394 |
| 5,805,804 | * 9/1998 | Lawsen et al. ............... 707/223 |
| 5,867,495 | * 2/1999 | Elliott et al. ............... 370/352 |

FOREIGN PATENT DOCUMENTS 0377136  7/1990  (EP) .

* cited by examiner

Primary Examiner—Daniel H. Pan

(57) ABSTRACT

Methods and associated structures and systems for managing the exchange of data among secured systems via various transport media and techniques. The transport manager of the present invention manages the transport of data between two systems using a variety of transport media while assuring robust, reliable exchange of such data. More specifically, the transport media managed by the present invention include media and methods which are not precluded from data exchange by security measures implemented on the source and destination systems. Such transport media may include email network communication, file transfer protocol network communication, hypertext transfer protocol, and manual exchange via magnetic or optical media. Each desired exchange identifies a particular source and destination computing system operable in accordance with the present invention. The methods of the present invention for transmitting and receiving the data identify the requested exchange as a job, associate a job ID with the job, and track status of the job in a job database file. An address book table is used to look up preferred transport media, methods, and parameters associated with a destination system.

28 Claims, 18 Drawing Sheets

METHODS AND STRUCTURES FOR ROBUST, RELIABLE FILE EXCHANGE BETWEEN SECURED SYSTEMS

BACKGROUND OF THE INVENTION

1. Field of the Invention

The present invention relates to computer network communications and in particular to methods and structures for simple yet robust and reliable file exchange between otherwise secured systems using a variety of communication media.

2. Discussion of Related Art

Computer networks are used for interconnection of a plurality of computer systems for purposes of exchanging information between such systems. In general, a network includes a number of computer systems interconnected by a one or more communication links. Local area network (LAN) is a term generally applied to relatively smaller networks wherein a number of computer systems are interconnected via a relatively short distance high-speed communication links. For example, a LAN may interconnect a number of computers within an office, a building or a campus. By contrast, wide area networks (WANs) tend to be larger networks comprising a larger number of computers interconnected by a wide variety of high-speed (shorter distance) and lower speed (longer distance) communication links. For example, a global business enterprise may interconnect their installations around the world with a WAN while each particular installation may utilize a LAN to interconnect its particular computer systems.

In a local area network it is common that all computers cooperate using the related low-level protocols. For example, all computers on a particular local area network (LAN) would typically share use of a single protocol such as TCP/IP, NETBEUI (from Microsoft), or IPX/SPX (from Novell). It is also common for multiple such protocols to be simultaneously operable over a particular LAN or WAN. Higher level networking protocols and applications then exchange data via these lower-level communication protocols.

Often a group of computer systems on a network are referred to as an enterprise. In general, as used herein, an enterprise is a large and diverse network connecting most major points in a company or other organization. As used herein, an enterprise may be synonymously referred to as a computing enterprise or a business enterprise.

It is common in computer networking to view the interconnected communications as a layered model, specifically a seven layer model often referred to as the Open Systems Interconnect (the so called OSI standard maintained by the International Standards Organization (ISO)). Higher layers in the model transfer their information to a corresponding next lower layer for detailed management of lower-level transmission issues. The higher layers of the model therefore communicate in effect with corresponding higher level components in other computers on the network. Each lower level of the OSI model, in turn, communicates with its corresponding lower layer embodied within other computers on the network. Such a layered model allows computer networking software to be developed in accordance with standard programming interfaces between the various layers. A particular layer may therefore be replaced by an equivalent component which provides similar services to the layer above and invokes lower-level services from a lower layer in accordance with a standard interface definition.

In general, wide area networks (WANs) use a wider variety of physical communication media for the exchange of data among a more geographically disperse set of computing systems. Each such diverse lower-level physical communication medium utilizes a corresponding lower level protocol layer in, for example, the OSI model.

Security is a constant challenge for networks and computing engineers responsible for networks. In particular, in wide area network applications, it is important for computing systems attached to such a network to secure their resources from inappropriate, unauthorized access. The Internet is an example of a global wide area network where security measures are often critical to an ongoing business enterprise connected to the Internet. Such security measures are required to assure that unauthorized third parties, anywhere in the world, cannot gain access to sensitive materials within the enterprise via the global, publicly accessible, Internet.

Though such security measures (often referred to as firewalls) are vital to secure each particular enterprise, they're very existence creates the burden for those trying to legitimately exchange information between enterprises via such global, public networks. A user in one particular computing enterprise encounters a number of difficulties exchanging data with another user in a different computing enterprise via computer system to computer system network communication links. Though the communication capability may exist, for example via the Internet, safeguards and security measures (firewalls) within each enterprise makes such enterprise to enterprise exchanges difficult—exactly as they are intended to do.

In general such firewall security measures operate at lower layers of the network communication layered model to filter out potentially harmful network data exchange. For example, the firewall may permit certain protocols to be exchanged only among certain network devices known to be physically secured within the enterprise. Network devices not within the permitted scope of secured devices are not permitted to use the filtered protocols. Should such un-authorized devices attempt such communications, the firewall simply discards their network data transfer requests.

A significant number of standard networking applications are capable of exchanging certain types of information without interference from security and safeguard mechanisms within an enterprise. Such applications are generally considered secure in that they cannot, in general, cause harm to or disrupt operation of the receiving computer system. For example, electronic mail messages are generally considered benign and therefore readily exchanged between most systems on the Internet regardless of implemented security measures and safeguards within each enterprise. Other standard protocols including hypertext transfer protocol (HTTP) are similarly limited in their capability and may therefore allow further exchange of information between computing systems which are otherwise secured. Still other "transport" techniques may be utilized to exchange information among otherwise secured business enterprises. For example, manual procedures such as transferring information via magnetic or optical medium, or other direct communication links such as modems which bypass secured network connections may be used to exchange information among the otherwise secured computing enterprises.

It is generally known to use such widely available networking protocols for purposes of exchanging information between otherwise secured computing enterprises. For example, attachment files are often transmitted with email messages to permit additional information to be transmitted with the known message. Such attachment files may, in general, contain any further information (textual or raw binary data) relating to the underlying email message.

However, use of such higher level protocols (email exchange protocols) or manual transmission techniques (i.e., exchange via a magnetic or optical medium) does not provide the robust reliable exchange of information normally required for exchange of large quantities of information between two otherwise secured computing enterprises. For example, and when using the email messages to exchange large volumes of information via attached files, there are no automated procedures known for assuring that the entire set of attached files are received once, only once, and reassembled in the correct order.

In view of the above discussion, it is evident that a need exists for improved protocol management to permit the exchange of data between processes on otherwise secured systems. Such systems may be geographically dispersed and interconnected via a wide area networking or generally devoid of network communication interconnection. Such protocol management would ideally assure robust, reliable transport of information between such otherwise secured computing enterprises.

SUMMARY OF THE INVENTION

The present invention solves the above and other problems, thereby advancing the state of useful arts, by providing management methods and associated structures for managing the transport of messages between processes otherwise secured computing enterprises. Further, the present invention performs such transport utilizing any of several transport mechanisms that may be available for transport between the source and destination systems. In particular, the present invention provides protocols and associated data structures to oversee information exchange via assorted methods including networking protocols as well as manual technologies. The methods and structures of the present invention assure robust, reliable transport of such information using a variety of transport protocols and mechanisms without interference from security mechanisms associated with the communicating computing enterprises.

In particular, the present invention comprises a transport manager which wraps transported messages in a management layer protocol to assure robust reliable transportation of messages via a variety of transport mechanisms. The transport manager in particular provides acknowledgment and re-transmission functions to assure transmitted information is received and combined as necessary in appropriate sequential order and processed correctly by the receiving application.

Still more specifically the transport manager of the present invention defines each file transfer as a job and maintains information regarding the status of each job in a job database file. The job database file stores information necessary to restart transmission of the particular job, to send acknowledgment relating to a particular job, and to monitor for various timeout parameters necessary to assure reliable transportation.

A further aspect of the present invention includes an address book which contains information to identify preferred transport methods associated with particular destination addresses. Other information associated with the address book identifies appropriate timeouts for particular transport methods and paths associated with particular destination addresses. The use of the address book provides a "shortcut" for sending processes to provide protocol and configuration parameters to the management portions of the present invention. An address book entry identifies a particular destination by an ID (e.g., a name) and supplies all other parameters for sending data through the management layer of the present invention to a receiving application in another secured system.

The transmission related module of the present invention resides in and is operable on a computing system desiring to transmit a message to receiving system. In like manner, a receiving related module of the present invention is cooperatively resident on the destination computing system. The modules on each side of the transmission link of the present invention present an application program interface (API) to client application programs. An application engineer therefore uses the transmission and reception API in integrating application programs on each side of the transmission link of the present invention.

Each process of the transmit/receive pair maintains information about the job in process in a corresponding database associated with that process (i.e., in a transmit job database and in a receive job database). The transmitting and receiving programs (processes) each register information in the job database of the present invention to identify each process engaged in a data exchange session. A transaction ID provides a globally unique identifier (GUID) for storage and retrieval of data in the job databases.

The transmission job database is also used to store information required for error recovery to assure reliable transmission of the exchanged data. Though the underlying protocols used to bypass firewall security may not provide the desired reliability, the management functions of the present invention serve to assure such reliable transmissions through timeout functions and acknowledgment handshaking. The management layers of the present invention shield the calling application from the details of using a particular protocol and communication medium. Rather, the sending and receiving applications invoke a common API interface regardless of the particular operating system, communication medium, and protocols selected for transmission of the supplied data.

The job database in the transmission and reception manager portions provide persistent storage of information to permit failure recovery even through system or power failures. When the system is restored to normal operation, the persistent stored data in the database (transmission job database and/or receiving job database) is used to resume operations exchanging data between the secured systems.

The present invention therefore permits computing systems segregated by security measures (firewalls) to communicate for purposes of exchanging data in a simple yet reliable and robust manner. The present invention also provides a common API interface for the sending and receiving applications regardless of the particular communication medium and protocol selected for transmission of a particular job. In addition, the present invention provides these features in an architecture which is highly portable between a number of commercial computing environments including Microsoft Windows, HPUX and a number of Unix dialects.

The above, and other features, aspects and advantages of the present invention will become apparent from the following descriptions and attached drawings.

DETAILED DESCRIPTION OF THE PREFERRED EMBODIMENTS

Figure 1:
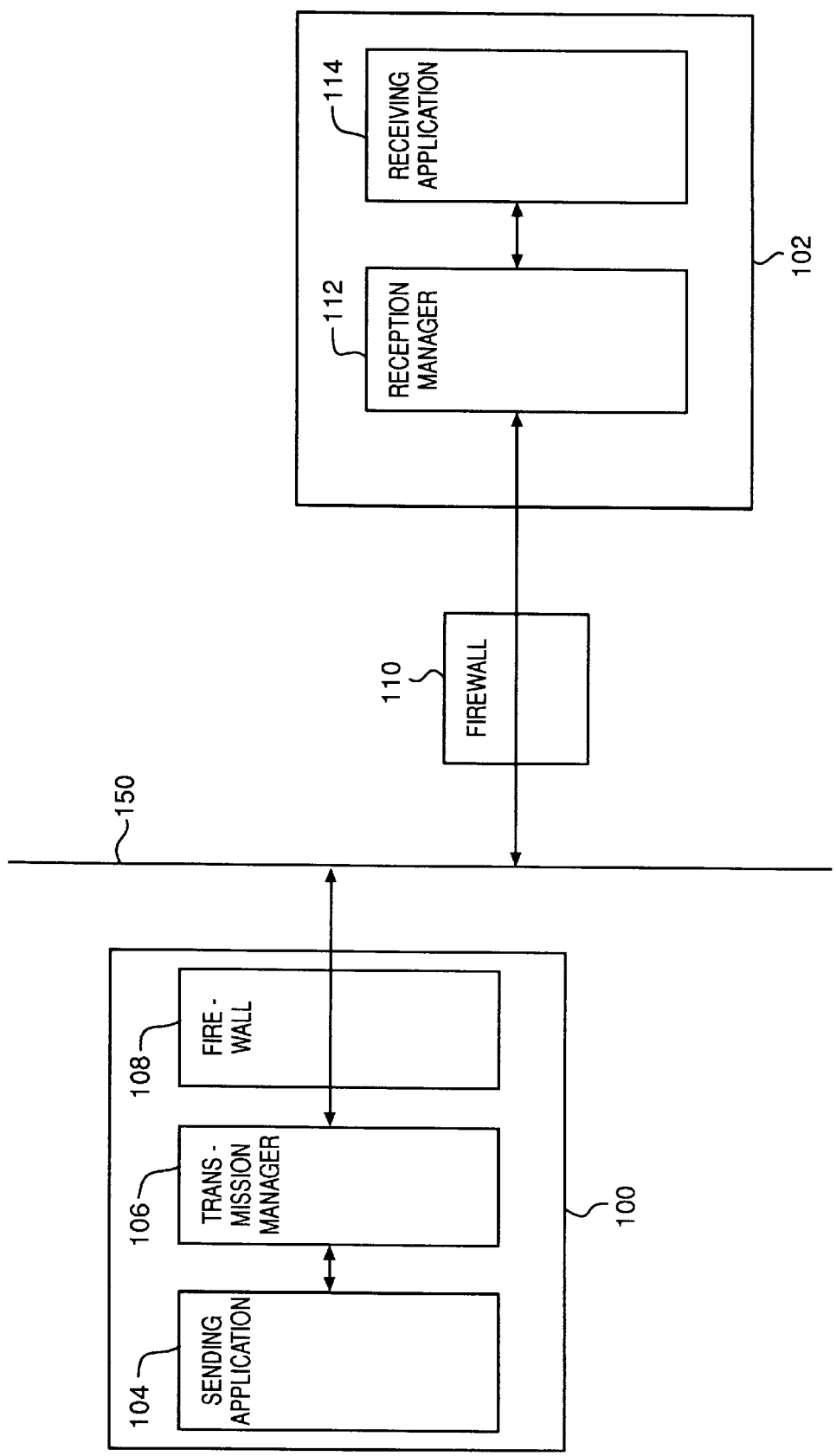
FIG. 1 is a blocks diagram of processes communicating between secured systems using electronic communication media in accordance with the present invention.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

FIG. 1 is a block diagram depicting secured computing systems 100 and 102 operable in accordance with methods and structures of the present invention. In particular, transmission manager 106 and corresponding reception manager 112, operable within first computing system 100 and second computing system 102, respectively, manage the exchange of information so as to cooperate with firewalls security measures implemented in the secured computing systems 100 and 102. As shown in FIG. 1, secured computing systems 100 and 102 communicate via network 150. Further as shown in FIG. 1, network 150 is intended to be representative of any network communication medium including a local area networks (LANs) or wide area networks (WANs).

In particular, sending application 104 operable within first secured computing system 100 is the originator of information to be transferred to receiving application 114 operable within second secured computing system 102. Sending application 104 works in cooperation with transmission manager 106 within first secured computing system 100 to effectuate the robust, reliable exchange of desired information. Reception manager 112 operates in conjunction with receiving application 114 to further assure robust, reliable transmission of the desired data between sending application 104 receiving application 114.

Transmission manager 106 is preferably implemented as a client process cooperating with reception manager 112 preferably implemented as a server process within their respective computing systems. As is known in the art, such client and server processes may be comprised of a number of sub components such as daemon programs and associated data structures to effectuate the desired client/server exchange.

In general, firewall security measures are configurable to allow and disallow particular types of data exchanges between particular computing systems. For example, first secured computing system 100 may be one of several computers within a first business computing enterprise. Second secured computing system 102 may likewise be one of many computing systems within a second business computing enterprise. Each business computing enterprise would implement firewall security measures to prevent unauthorized outsiders from accessing sensitive information within their respective business computing enterprises. However, there are often legitimate requirements for transmitting information between two such secured business computing enterprises. For example, a user in a first business computing enterprise may be a supplier of computing products while a user in the second computing enterprise may be a consumer of the products. The user in the first business enterprise may need to transfer large volumes of data to the user in the second enterprise such as upgraded or repaired programs or data files.

Presently known solutions do not provide for robust, reliable transmission of such data. For example, email programs and protocols, though capable of exchanging information through firewall security techniques and capable of attaching data files thereto, do not assure robust, reliable application to application delivery and successful processing of data files as may be required in various applications. Rather, the sending user or application transmits the desired data to the receiving user or application but has no assurance that the transmission was successfully processed at its intended destination (the receiving application).

Transmission manager 106 and reception manager 112 of FIG. 1 therefore provide robust reliable exchange of information between secured computing systems. In particular, as discussed further herein below, transmission manager 106 and reception manager 112 are operable in conjunction with standard network protocols and programs such as email protocols and HTTP protocols to provide the requisite robust, reliable exchange of information through firewalls. In addition, as discussed further below, the transmission manager 106 and reception manager 112 may communicate via other communication media and protocols including manual transmissions such as the manual exchange of magnetic or optical storage media. Essentially, the cooperating transmission manager 106 and reception manager 112 provide a management layer, a wrapper, in which data is exchanged between secured computing systems. This exchange may be effectuated via any of several communication media and protocols. This management layer provides end to end reliable, robust exchange and processing of information between a sending application on the first secured computing system and a receiving application on the second secured computing system.

As shown in FIG. 1, transmission manager 106 uses network communication protocols to transmit information generated by sending application 104 through firewall 108 directed to second computing system 102 via network 150. The transmission passes through firewall protection 110 associated with second system 102 and onto reception manager 112. As shown in FIG. 1, firewall 108 is implemented as software modules operable within first secured computing system 100. Alternatively, firewall 110 of FIG. 1 is shown as a stand-alone device connected to network 150 to provide firewall security measures on behalf of second computing system 102 (and potentially other connected computing systems). Networking devices such as routers and bridges often provide such firewall protection capabilities within their networking functionality. Firewalls 108 and 110 are therefore intended as exemplary of a large variety of well-known firewall techniques and devices. Transmission manager 106 and reception manager 112 are therefore operable to utilize communication media and protocols which are capable of passing through such firewall protection.

Figure 2:
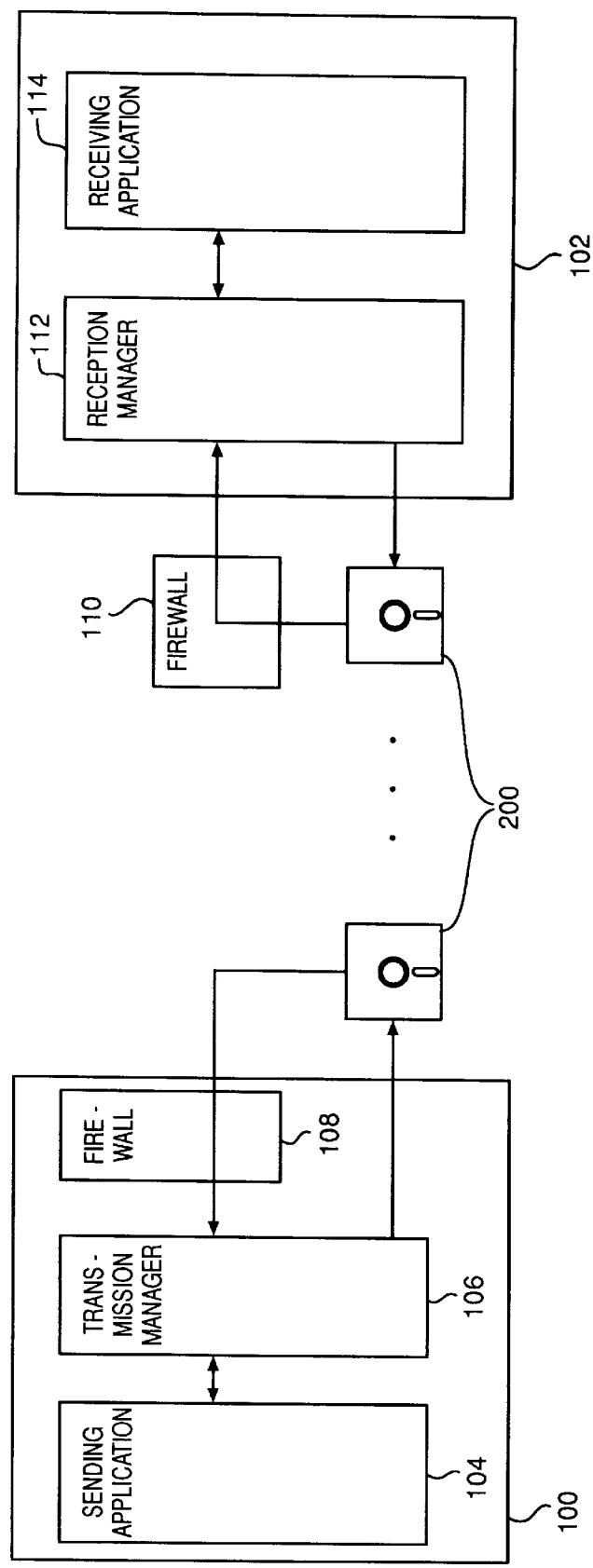
FIG. 2 is a blocks diagram of processes communicating between secured systems using manual transport of storage media in accordance with the present invention.

As noted above, firewall protection is known in the art to be applicable to a number of communication techniques and media. FIG. 2 depicts an alternative embodiment of the present invention wherein magnetic media 200 (e.g., floppy disk, optical storage medium, tape medium, etc.) are utilized to manually transport requested information between computing system 100 and 102. Transmission manager 106 and reception manager 112 are therefore adapted to utilize a wide variety of communication media and protocols for changing information between the secured computing systems 100 and 102. In general, as shown in FIG. 2, information generated by sending application is written directly to magnetic media 200 by transmission manager 106 without requiring any interactions with firewall protection 108. Likewise, reception manager 112 may write returned information on magnetic media 200 without interactions with firewall 110. In both cases, reading returned information transmitted information from magnetic media 200 preferably passes through firewall protection techniques so as to assure secured communication between secured computing systems 100 and 102.

As can be seen from the above discussion, "firewall" protection techniques, as used herein, refers to a wide variety of security measures and devices useful with secured computing systems to enable and disable exchange of particular forms of data between particular systems. Transmission manager 106 reception manager 112 are therefore operable to exchange information on behalf of sending application 104 in receiving application 114 via a variety of communication media and protocols through a variety of firewall techniques or devices.

Figure 12:
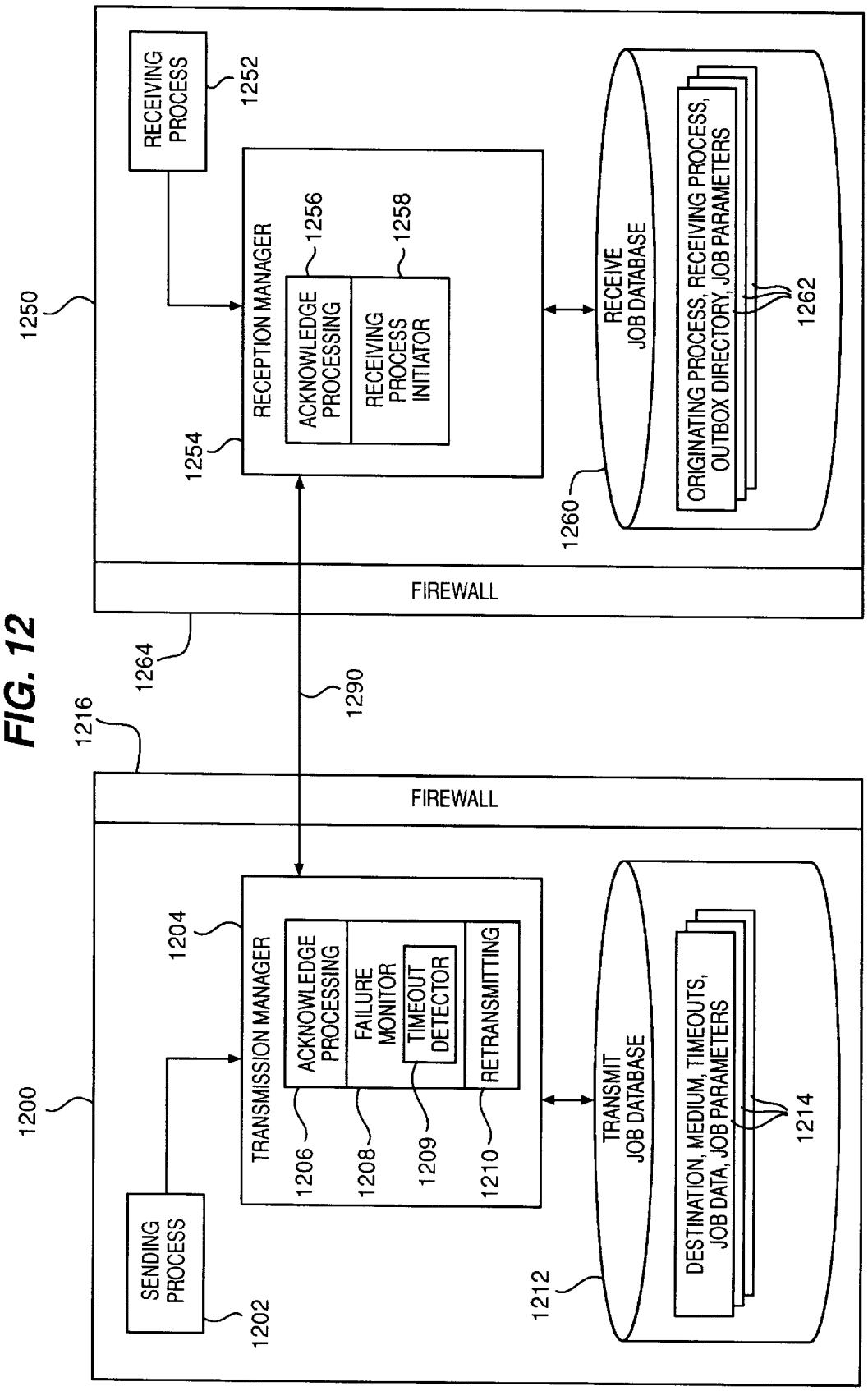
FIG. 12 is a block diagram describing structure of the elements and processes of the present invention to provide communication between otherwise secured systems.

FIG. 12 is a block diagram depicting apparatus and structure of the present invention to provide robust, reliable communication between secured computing systems. First secured computing system 1200 communicates with second secured computing system 1250 through firewalls 1216 and 1264, respectively, via communication medium 1290. In particular, sending process 1202 operable within first secured computing system 1200 communicates with corresponding receiving process 1252 operable within second secured computing system 1250. Transmission manager 1204 operable within first secured computing system 1200 manages the transmission of information sent by sending process 1202. The corresponding reception manager 1254, operable within second secured computing system 1250, further manages the exchange of information between the secured computing systems on behalf of sending process 1202 and receiving process 1252.

Transmission manager 1204 preferably includes acknowledgment processing element 1206 operable to request acknowledgment from reception manager 1254. Acknowledgment processing element 1206 is also operable to monitor reception of the requested acknowledgment message from the reception manager 1254. As noted further herein below, aspects of the protocols exchanged between the secured computing systems via medium 1290 are symmetric. For example, acknowledgment processing element 1206 preferably further includes processing components for responding to acknowledgment requests received from reception manager 1254.

Transmission manager 1204 preferably further includes failure monitoring element 1208 which determines whether a transmission from transmission manager 1204 to reception manager 1254 was successful or failed. In particular, failure monitoring element 1208 preferably includes a timeout detector element 1209 for detecting timeout conditions while awaiting acknowledgment of a transmitted job. In general, as discussed in further detail herein below, the successful transmission is detected by reception of an appropriate acknowledgment by acknowledgment processing element 1206. A failed transmission is detected by failure monitoring element 1208 detecting a timeout condition through timeout detector element 1209. Such a failure detection triggers a retransmission attempt within transmission manager 1204. Eventual acknowledgment of a transmitted or re-transmitted job is recognized as a successful transmission of the job from first computing system 1200 to second secured computing system 1250. Re-transmitter element 1210 is responsible for performing requisite retransmission of a job in response to detection of a failure by failure monitoring element 1208.

Transmission manager 1204 stores persistent information regarding status of transmission jobs in transmit job database 1212. Entries 1214 in transmit job database 1212 retain information regarding status and progress of a particular job to be sent to second secured computing system 1250 on behalf of sending process 1202. Such information preferably includes identification of the destination process (i.e., receiving process 1252 in second secured computing system 1250), timeout parameters associated with the transmission medium, the actual job data, and various other parameters required for transmission of the job between the two secured computing systems. Persistent storage of such job information permits failure detection and recovery of the job to enable robust reliable communication between the secured computing systems.

Reception manager 1254 operable within second computing system 1250 preferably includes acknowledgment processing element 1256 analogous to acknowledgment processing element 1206 within transmission manager 1204 of first secured computing system 1200. In general, acknowledgment processing element 1256 is operable to respond to acknowledgment requests generated by acknowledgment processing element 1206 within transmission manager 1204. As noted herein above, acknowledgment request and response aspects of the protocol between the two computing systems are symmetric under certain conditions. In other words, acknowledgment processing element 1256 is also operable to generate acknowledgment requests directed back toward acknowledgment processing element 1206.

Reception manager 1254 maintains information in a received job database 1260 to permit failure detection and recovery for communication between the two computing systems. Entries 1262 in received job database 1260 persistently store parameters required by reception manager 1254 to monitor progress and processing of a job transmitted from transmission manager 1204. For example, entries 1262 preferably include information identifying the originating process (i.e., sending process 1202 and transmission manager 1204), the receiving process 1252 identified by sending process 1202 as associated with the transmitted job, and OUTBOX directory structure identification for storage of transmitted job data, and various other job parameters required for robust, reliable change of information between the two secured computing systems.

Figure 13:
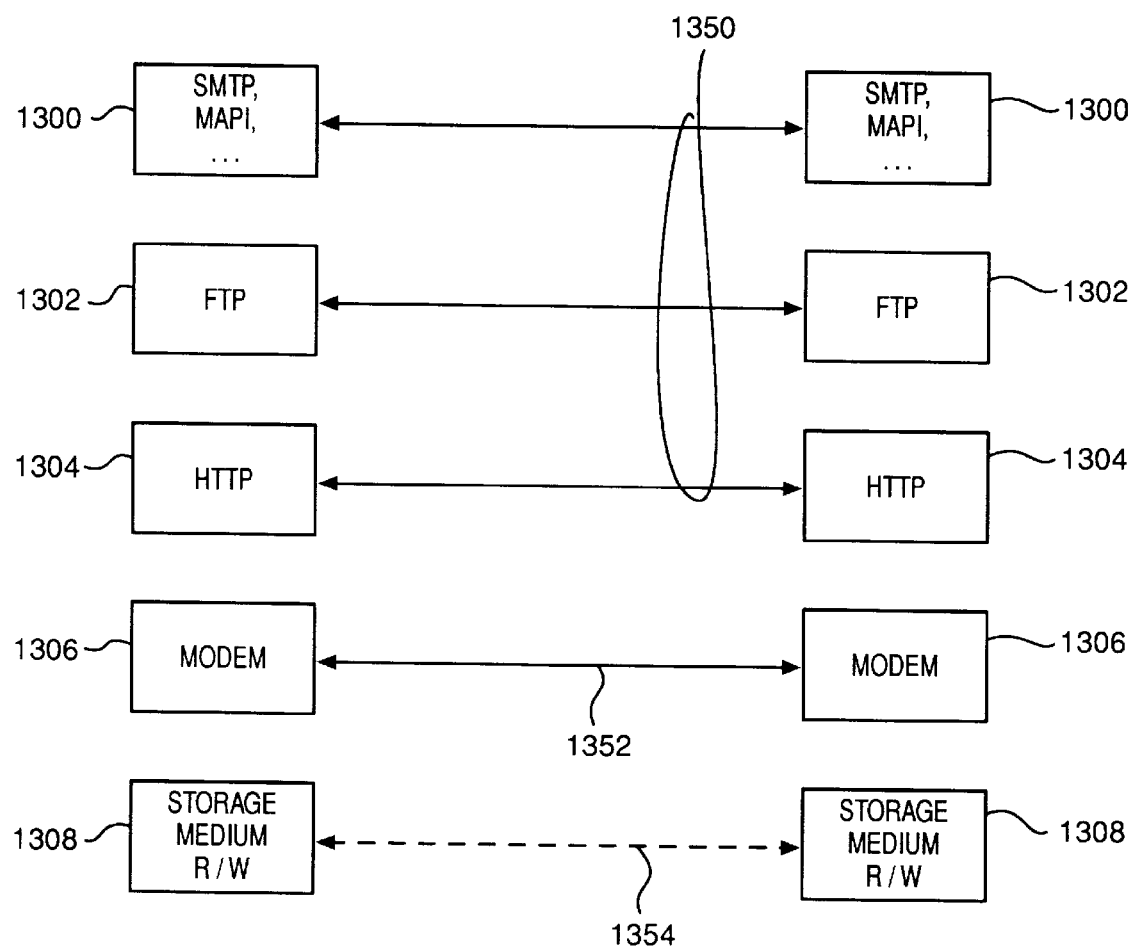
FIG. 13 is a block diagram describing various exemplary protocols and associated transmission media utilized by the present invention.

As noted above, communication medium 1290 may be any of several communication media and protocols capable of communicating through firewalls 1216 and 1264. FIG. 13 depicts a number of such communication media and protocols operable within transmission manager 1204 and reception manager 1254 of FIG. 12 for communicating via medium 1290. In particular, email protocols 1300 (such as SMTP, POP, Microsoft Exchange, MAPI, etc.) of FIG. 13 may communicate through firewall protection techniques via a network communication medium 1350. Similarly, HTTP protocols 1304 may be used over network communication media 1350. Direct modem connections protocols 1306 may be applied to modem media 1352 (i.e., direct modem connections via telephone or other hard-wired communication links). Furthermore, magnetic or optical storage medium and associated read/write devices 1308 may be used to manually transport job data files between two secured computing systems. Such manual transport is depicted in FIG. 13 as dashed line 1354.

FTP protocols 1302 of FIG. 13 are somewhat unique in that their application to secured systems is not standardized. FTP protocols include their own security measures. Particular enterprise installations may permit FTP protocols to pass through firewall protected systems because the FTP security measure are effective to secure sensitive data. Other installations may simply reject FTP protocols at the firewall security as too large a security risk to their enterprise. Those skilled in the art will therefore recognize that FTP protocols may be applied in conjunction with the management features of the present invention. However, application of FTP protocols in conjunction with the present invention may vary depending upon installation parameters of the particular computing enterprise. FTP protocols are easily used in conjunction with the present invention to exchange information within a single secured system. Though the features of the present invention are most useful in communications between secured systems, they may be similarly applied to non-secured communication applications such as within a single secured enterprise or between unsecured systems.

FIGS. 1, 2, and 12 show only a transmission manager portion of the invention resident in the first secured computing system and only a reception manager portion in the second secured computing system. Preferably, the two components are in fact implemented as a single API module such that both transmission and reception functions are operable within each system. More specifically, both transmission and reception API functions are invoked in processing within both secured computing systems for purposes of acknowledgment handshakes discussed below. As discussed further below, the transmission manager receives acknowledgment messages from the second system and the reception manager transmits acknowledgment messages to the first.

Data Flows in the Preferred Embodiments

Figure 3:
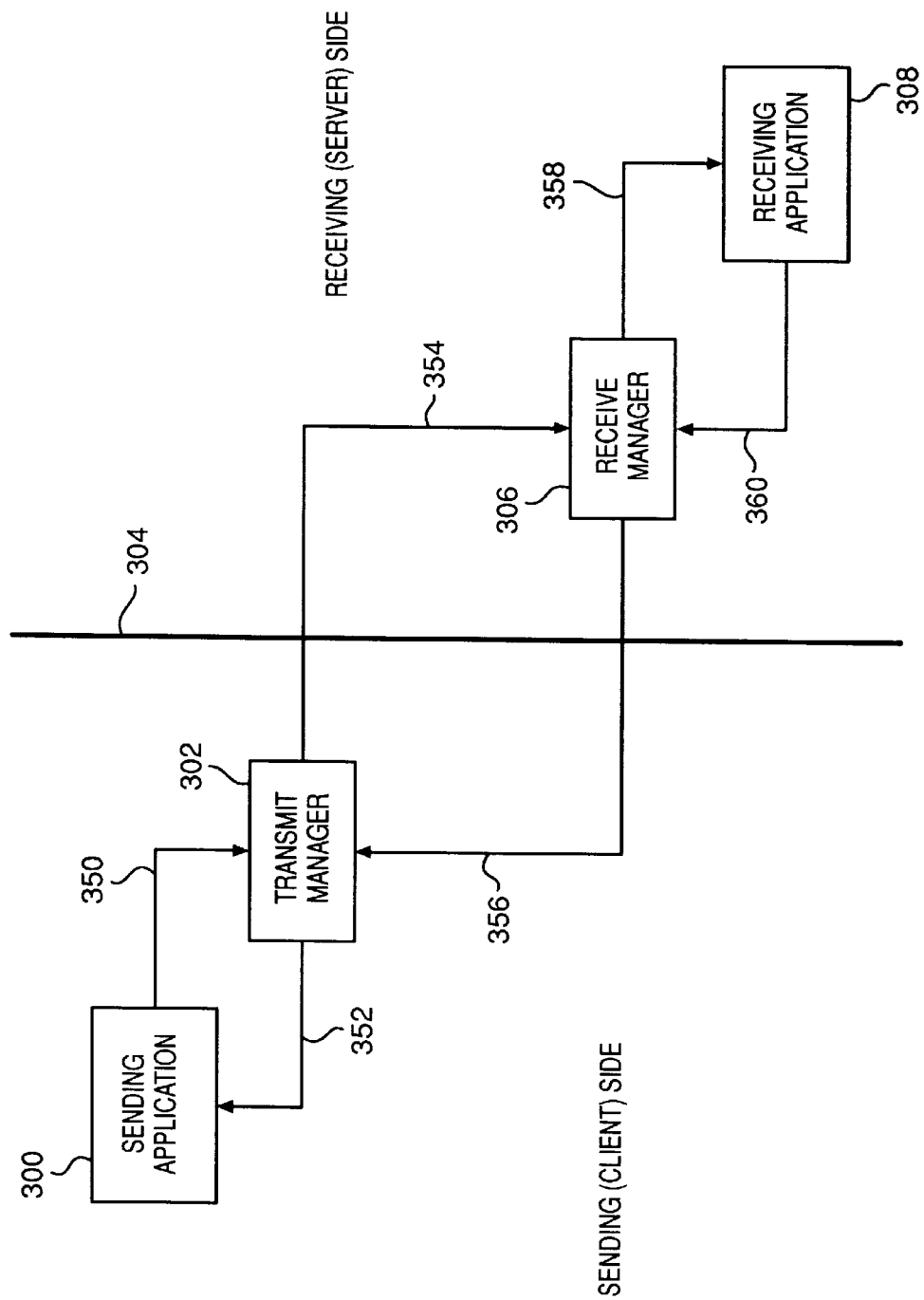
FIG. 3 is a block diagram depicting data flow between processes of the present invention.

FIG. 3 describes the transport management of the present invention in a high-level data flow diagram. A sending application 300 creates a job object utilizing API functions of the transmission manager 302 of the present invention. The transmission manager 302 transmits the data associated with the job object over communication medium 304. As noted above, the communication medium and protocols utilized are capable of passing through firewall protection techniques applied to both the transmitting receiving side of the transport manager. The job object data is received by reception manager 306 of the present invention. Transmission manager 302 and reception manager 306 coordinate acknowledgment and error recovery for transmissions there between.

The job object received by a reception manager 306 is then forwarded to an identified receiving application 308. Acknowledgment and error messages are communicated in the reverse direction: from the receiving application 308 to reception manager 306, thence from reception manager 306 to transmission manager 302, and finally, on demand, status is reported from transmission manager 302 to sending application 300.

Communication paths 350 and 352 between sending application 300 and transmission manager 302 are preferably implemented as interprocess communication (IPC) links. Communication paths 354 and 356 between transmission manager 302 and reception manager 306 utilize communication medium 304 as selected for a particular job transmission. Communication paths 358 and 360 between reception manager 306 and receiving application 308 are preferably IPC links.

Figure 4:
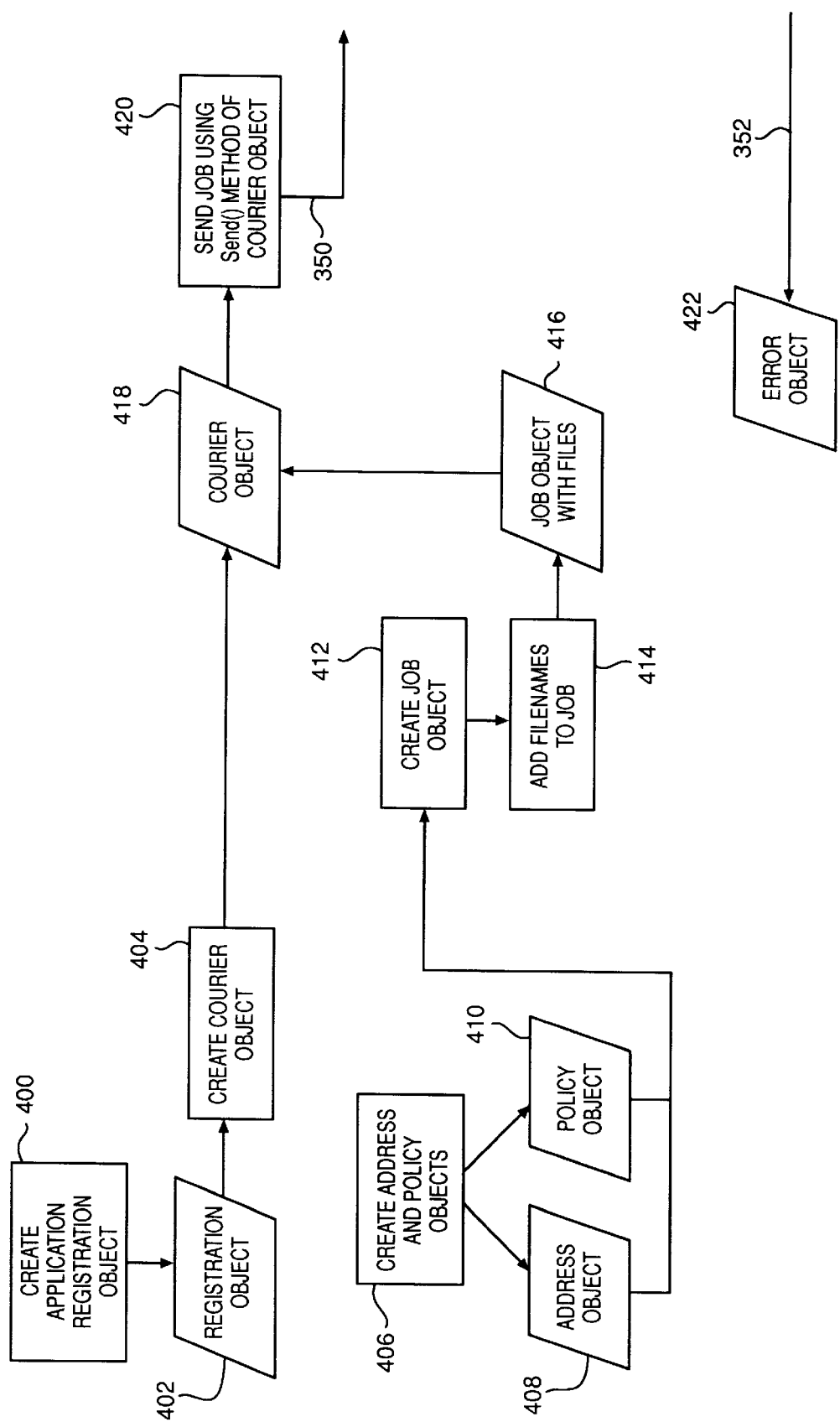
FIG. 4 is a block diagram depicting additional detail of data flow of FIG. 3 within a sending application.
Figure 5:
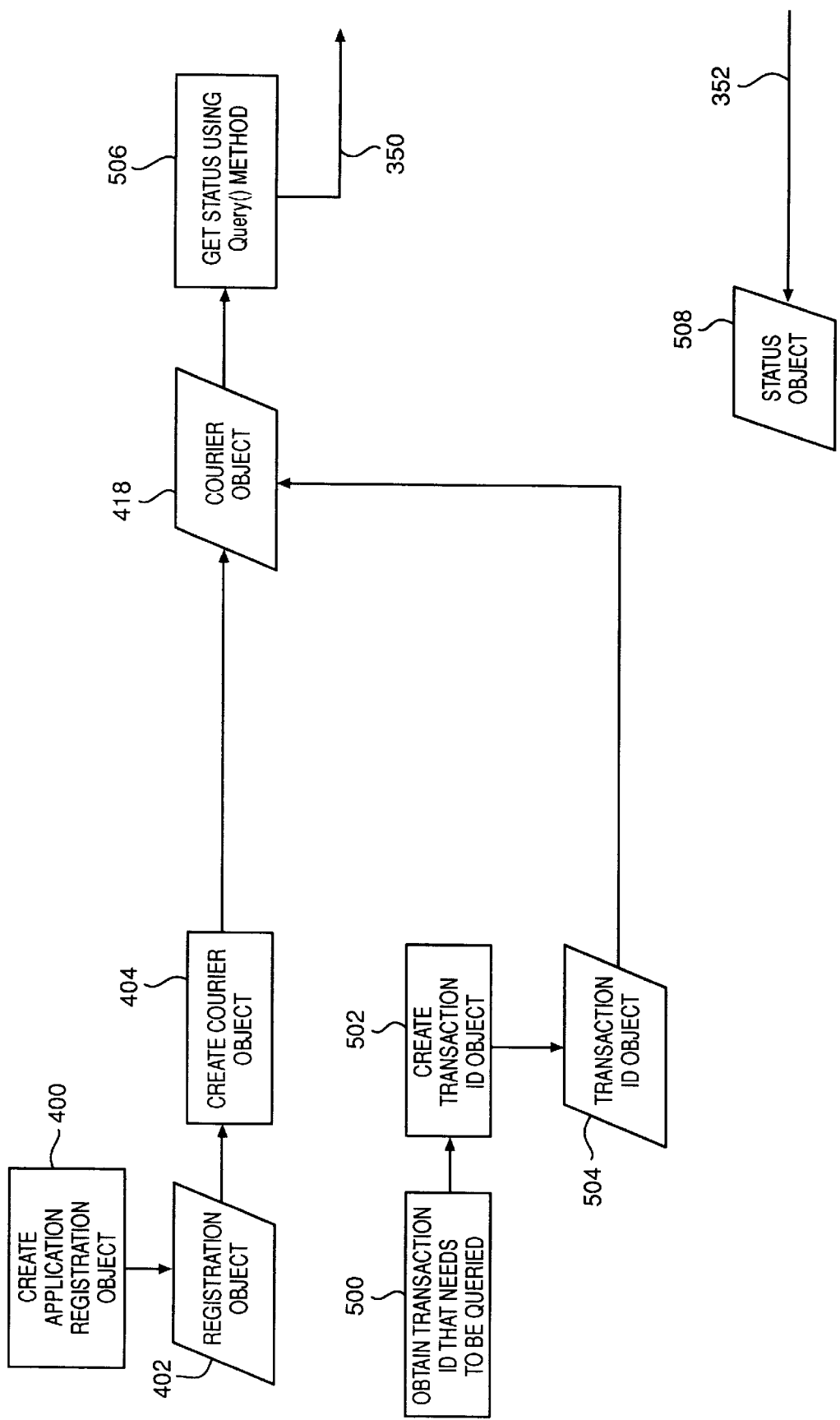
FIG. 5 is a block diagram depicting additional detail of data flow of FIG. 3 within a sending application.

FIGS. 4 and 5 provide additional detail of the data flow performed within the sending application 300 when used in conjunction with the transport manager of the present invention. Specifically, FIG. 4 describes data flow pertaining to operation of sending application 300 to create a job for transmission to a second secured computing system. Sending application 300 first invokes an API function 400 to create an application registration object 402. This object 402 serves to register the sending application with the transmission manager for further interactions. The registration object 402 so created is then used in invocation of an API function 404 to create a courier object 404. Additionally, sending application invokes another API function 406 to create address and policy objects 408 and 410 identifying the intended destination for the job to be transmitted, and other parameters associated with the transmission of the job. The address object 408 and policy object 410 so created are then used in invocation of API function 412 to create a job object 416 describing the transmission job. Subsequent API function calls 414 add particular data files to the transmission job represented by job object 416. A single transmission job may therefore comprise one or more data files to be transmitted to the second secured computing system. The courier object 418 is associated with the particular job object 416 to be transmitted in this job instance. The courier object 418 therefore may be utilized for transmission of a plurality of discrete jobs, each defined and created by the user as described above with respect to API functions 406, 412, and 414. Each particular job object 416 so created is then transmitted by the sending application by invocation of the sending method 420 of the courier object 418. Should the transmission result in error conditions (an unrecoverable error), an error object 422 is returned to the sending application from the transmission manager.

FIG. 5 provides additional data flow details regarding operation of the sending application for querying the status of a previously transmitted job. API functions 400 and 404 are used as described above for creation of registration object 402 and courier object 418 for purposes of querying the status of a previously transmitted job. Sending application invokes API function 500 to obtain the transaction ID for the previous job for which status is to be queried. The sending application then invokes an API function 502 to create a transaction ID object 504. The sending application then invokes the query method 506 of the courier object 418 to determine the present status of the job identified by transaction ID object 504. The present status of the identified job is returned to the sending application by invocation of the query method 506. When the status of a particular job changes, a new status object 506 is asynchronously received. The status object 508 is then used to update the status of its identified job. By repetitive invocation of the query method 506, the sending application may eventually determine the completion status of a previously transmitted job.

Figure 6:
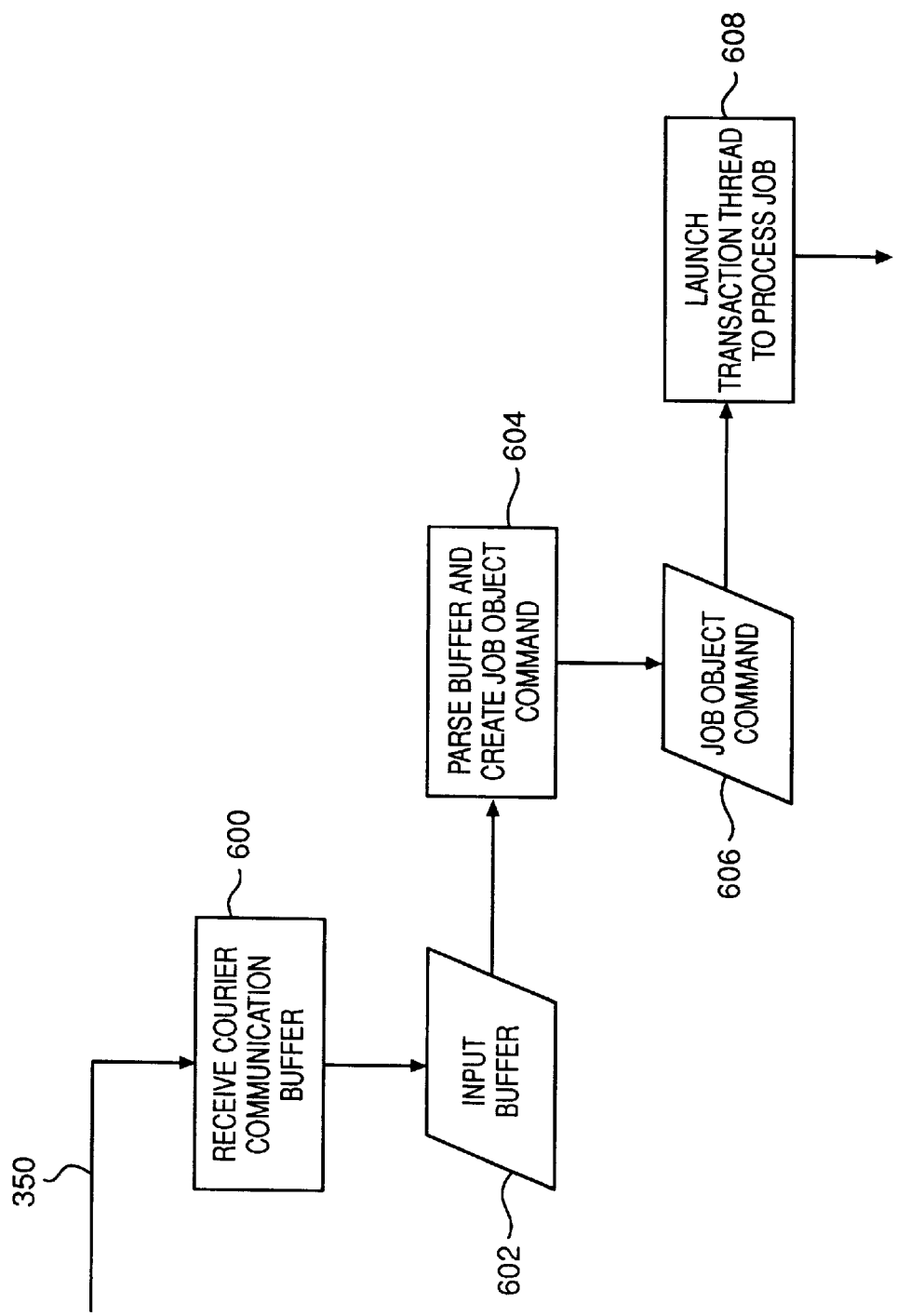
FIG. 6 is a block diagram depicting additional detail of data flow of FIG. 3 within the transmission manager.
Figure 7:
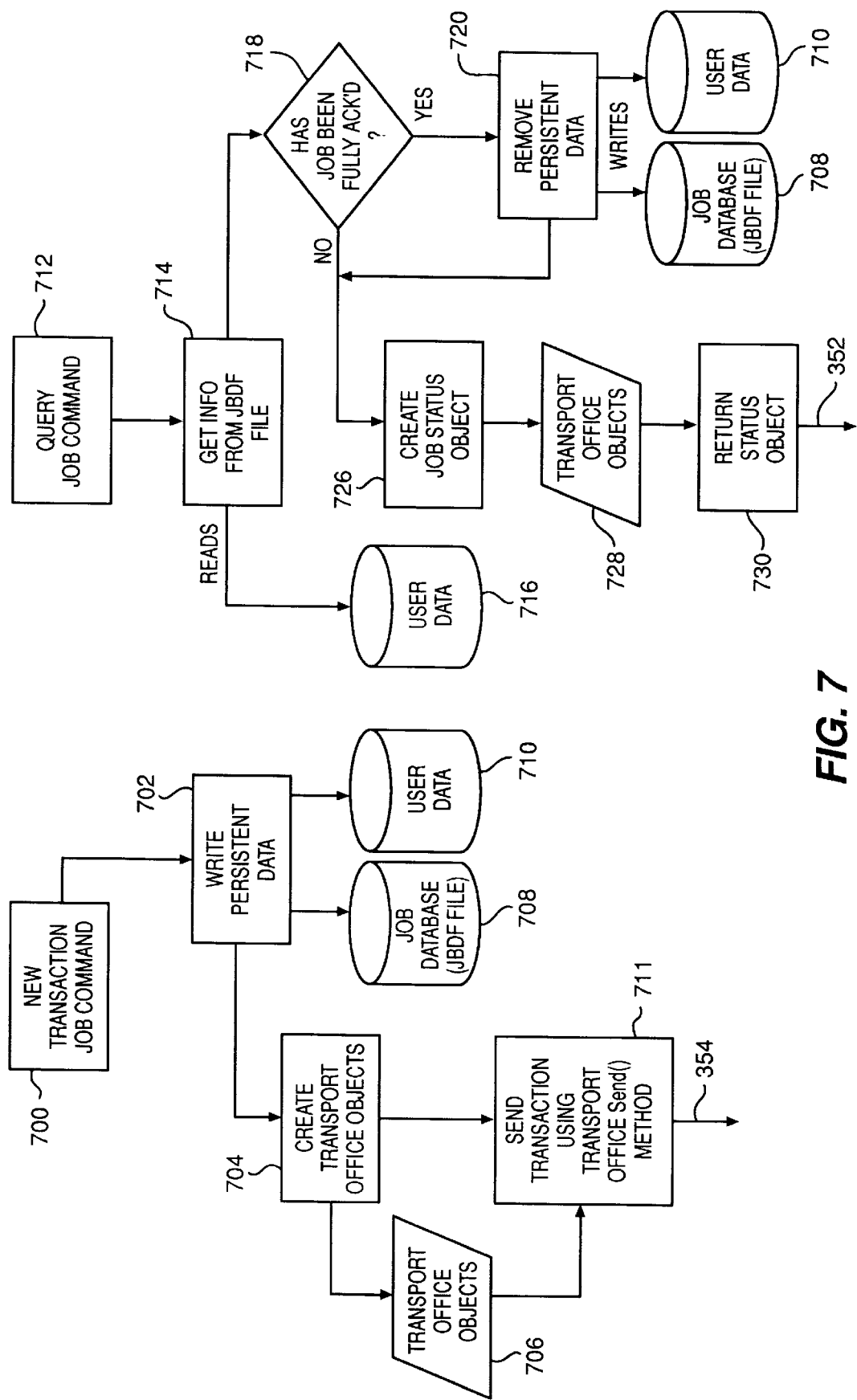
FIG. 7 is a block diagram depicting additional detail of data flow of FIG. 3 within the transmission manager.

FIGS. 6 and 7 provide additional data flow details regarding the operation of transmission manager 302 of FIG. 3. A courier communication buffer is received from the sending application by element 600. The courier communication buffer includes an input buffer object 602. Preferably, the inter-process communications between the sending application and transmission manager are performed utilizing well-known inter-process socket communication techniques. Those skilled in the art will readily recognize a variety of other design choices for inter-process communication.

The received input buffer object 602 associated with the courier communication buffer is parsed by operation of element 604 and an appropriate job object command 606 is created by invocation of an appropriate API function. Elements 608 then launches an independently operating thread to process the requested transmission job object command 606.

FIG. 7 provides additional details regarding the data flow within transmission manager 302 to process of a particular job (element 608 of FIG. 6). Specifically, elements 700 through 711 relate to processing of a new transmission job while elements 712 through 730 relate to a query command requesting status of a previously initiated transmission job.

Element 700 is operable in response to a command requesting the transmission of a new job object. Element 702 then writes data and parameters of the job in the persistent storage of the system to enable failure detection and recovery. User data files associated with the job object are copied to user data files 710. Other parameters required for failure detection and recovery are written to the transmit job database 708.

Element 704 is then operable to create the various objects 706 required for invocation of the send method. The send method is then invoked at element 711 to send the transmission job to the second secured computing system over the communication medium (via communication path 354 of FIG. 3).

Element 712 is operable to process a job object whose command requests a status update (the query method of the job). First, element 714 locates the identified job in the transmit job database 716. Element 718 then determines whether the database entry so located indicates that the job has been completed (fully acknowledged by the second secured computing system). If element 718 determines that the job has been fully acknowledged, element 720 is then operable to remove persistent data (708 and 710) related to the completed job. As discussed further herein below, in the preferred embodiment, completed job information is left in the job database for a period of time to permit "off-line" analysis and gathering of statistics. The period of time is preferably configurable by administrative users of the present invention. Processing then continues with element 726 to generate a query response indicating a completed status for the identified job.

If element 718 determines that the job is not yet completed, processing continues with element 726 to create an appropriate response to the query. The present status of the job is associated with a status object 728 created by element 726. Element 730 then returns the status object to the sending application which invoked the query method. The status object is returned via IPC communication path 352 of FIG. 3.

Figure 8:
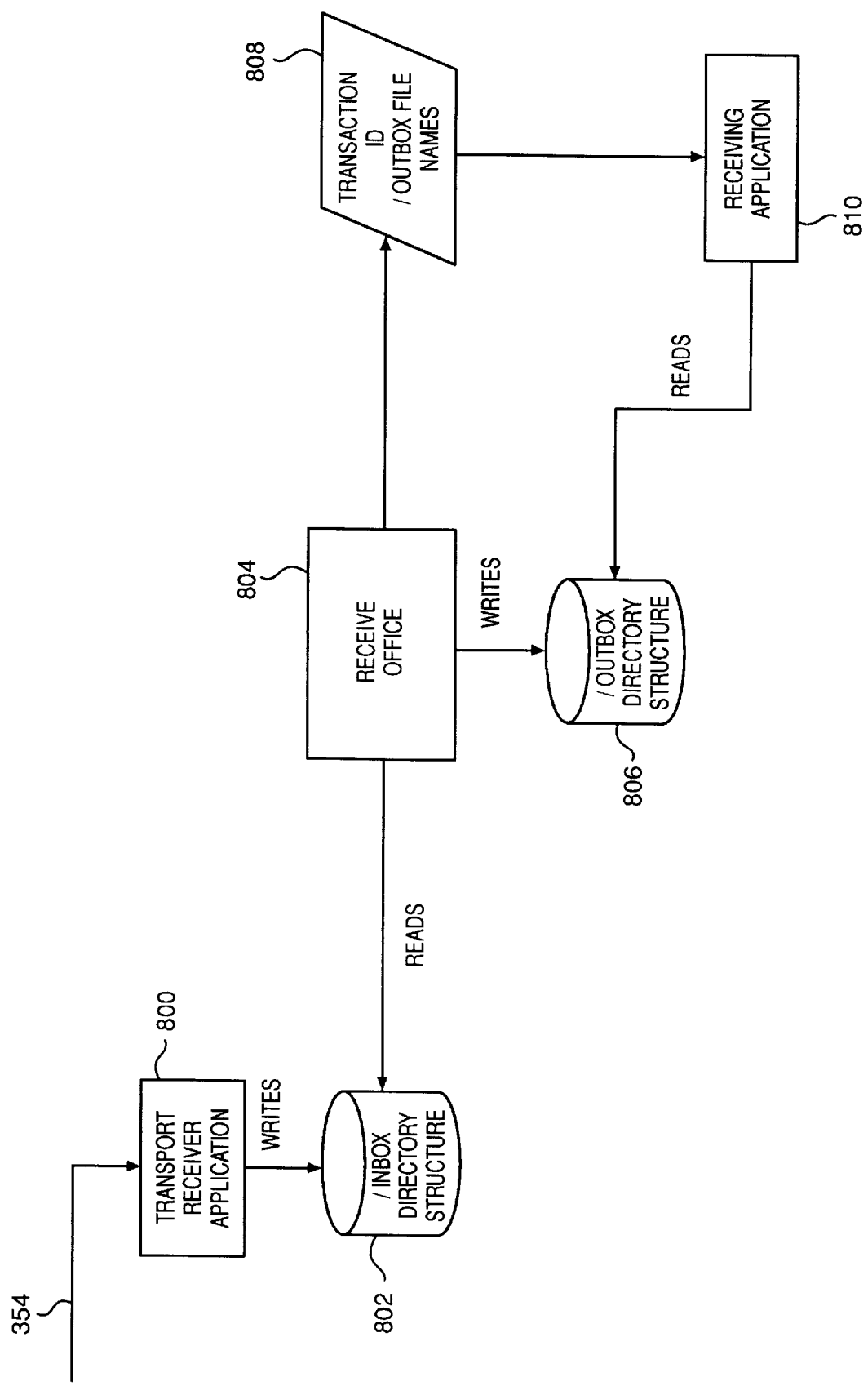
FIG. 8 is a block diagram depicting additional detail of data flow of FIG. 3 within the reception manager.
Figure 9:
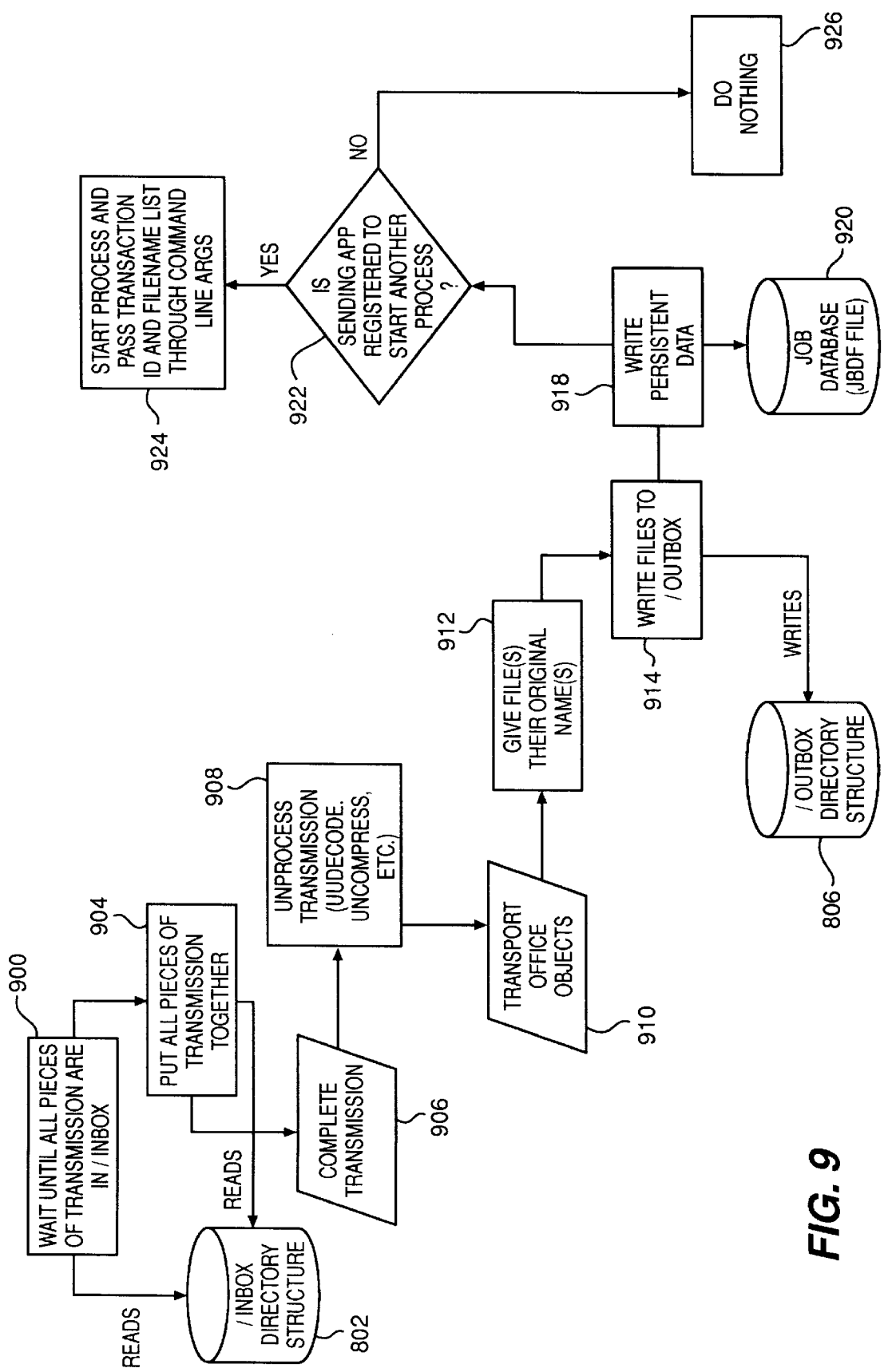
FIG. 9 is a block diagram depicting additional detail of data flow of FIG. 3 within the reception manager.
Figure 10:
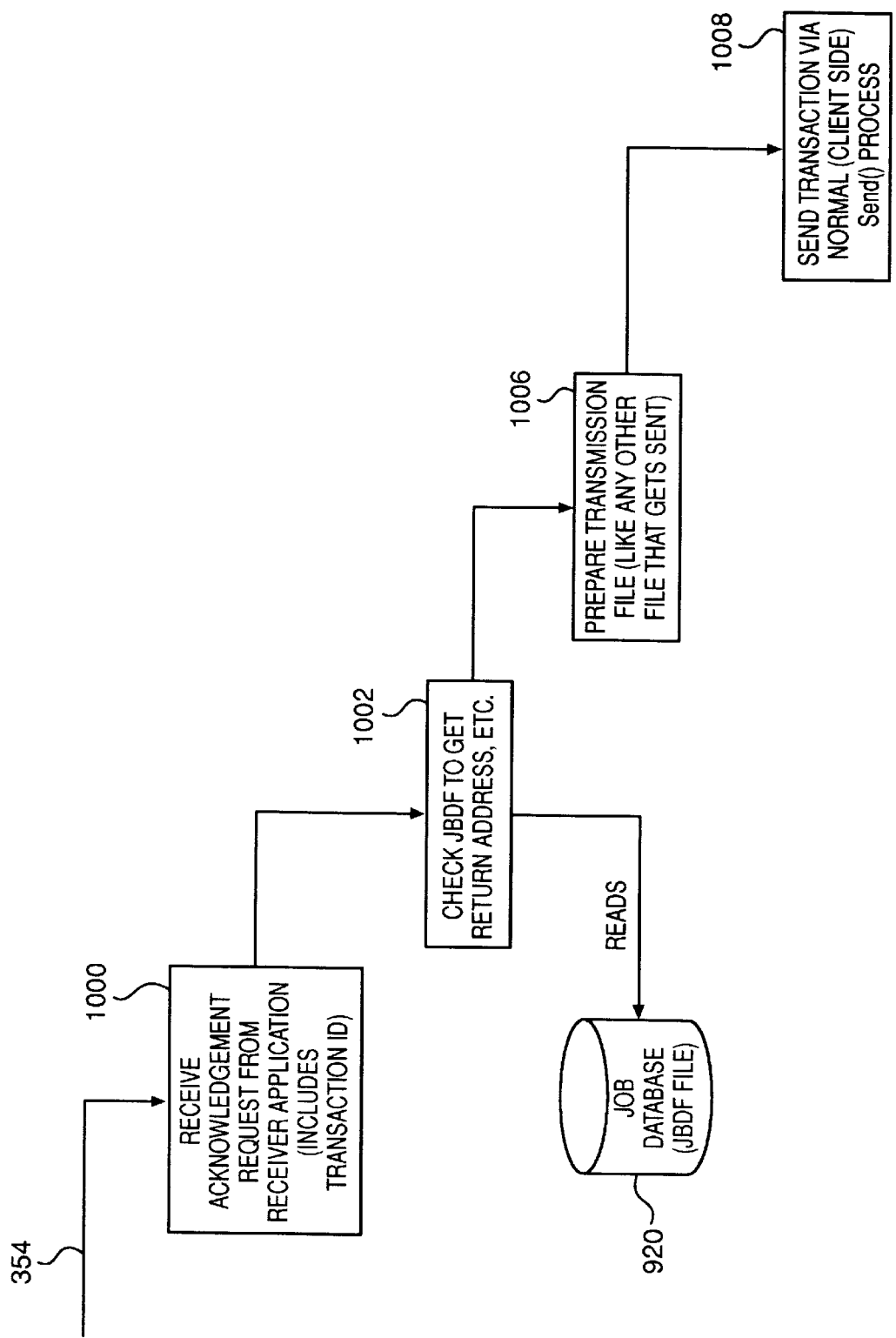
FIG. 10 is a block diagram depicting additional detail of data flow of FIG. 3 within the reception manager.

FIGS. 8, 9 and 10 provide additional data flow details regarding the operation of reception manager 306 of FIG. 3. A transport receiver process 800 of FIG. 8 is a process which is waiting for information to arrive from a transmission manager. In the preferred embodiment, process 800 is implemented as a small, stand alone application program launched in response to receipt of information. Those skilled in the art will recognize the equivalence of implementing such a process as a background task, a daemon, within the computing system. Such design choices are well known to those in the art.

As noted above, the communication medium may include network connections and associated network protocols such as email, FTP and HTTP networking protocols, direct modem connections, as well as manual transmission medium including magnetic or optical storage media. In whatever form the data is received from communication path 354, transport receiver process 800 writes received data into the INBOX directory structure 802 for subsequent processing by the reception manager. The receive office process 804 is an asynchronously operating process which reads INBOX directory structure 802 to detect when new transmission jobs have arrived. Header information associated with a received job identifies the particular transaction ID 808 associated with the job as transmitted to process 800. The transaction ID is then used in encoding the file name for files stored in the INBOX directory structure 802. The transaction ID is also used to identify a particular, unique OUTBOX directory structure 806 associated with the particular transaction. Information read from INBOX 802 by receive office process 804 is therefore written to an appropriate OUTBOX directory structure associated with the particular transaction ID 808 of the transmission. In this way, receive office process 804 is capable of processing a number of simultaneous transmission connections from a plurality of transmission managers. An appropriate receiving application 810 is launched by processing of receive office 804 for purposes of receiving and further processing of a particular transmission job. Receiving application 810 reads the received information from its associated OUTBOX directory structure 806.

FIGS. 9 and 10 provide additional detail of the data flow within receive office process 804 of FIG. 8. Element 900 represents processing within the receive office process 804 which determines when a complete transmission for a particular transaction ID has been received in the INBOX directory structure 802. When element 900 recognizes that a complete transmission is presently wholly contained within INBOX directory structure 802, element 904 process information in the INBOX directory structure 802 to gather and reconstruct the pieces of the job transmission in the proper order. The complete transmission 906 reconstructed in the appropriate sequence by processing of element 904 is then further processed by element 908 to decompress or decode any encoded information in the job and job objects 910 with associated data files are thereby created.

The "un-processed" transmitted job represented by job objects 910 is forwarded to element 912 for further processing to restore original filenames, if required, to the files transmitted in the job. The un-processed files with original filenames restored are then forwarded to element 914 which writes the files into the OUTBOX directory structure 806 associated with this particular transaction. The OUTBOX directory structure 806 serves as the persistent storage for data files associated with the job objects 910. Other persistent data associated with this particular job is then written by processing of element 918 into a job database file 920.

Element 922 is then operable to determine whether the sending application associated with this transaction ID is "registered" to initiate another receiving application process. The reception manager portion of the present invention maintains a database file recording sending processes which have initiated a transaction with a corresponding receiving process. An administrative configuration process within the second secured computing system generates a mapping table file which stores information to identify the required receiving process associated with a particular transaction.

If a receiving process is so registered to be launched, the process to be initiated is identified and initiated by processing of element 924. If no such application (receiving process) is to be initiated, no further processing is required as indicated by element 926.

FIG. 10 is a data flow diagram providing additional details regarding the operation of receive office process 804 of FIG. 8 when responding to a request for acknowledgment from the receiving application/process (the ACK method of the reception manager). Element 1000 is first operable to receive the acknowledgment request (ACK method invocation) via IPC communication path 354 from the receiving process. An acknowledgment request includes as a parameter thereof a transaction ID identifying the particular job for which the acknowledgment request is solicited.

Element 1002 is next operable to check the job database file 920 to locate the transmission manager return address associated with the supplied transaction ID. The job database file 920 associated with the reception manager records transaction ID and associated control data required to complete a particular transmission transaction.

Element 1006 is then operable to prepare an appropriate acknowledgment response. Specifically an acknowledgment response is preferably formulated and transmitted in a manner which mirrors the transmission manager discussed herein above. Still more specifically, element 1006 prepares information for transmission to a reception manager resident in the other secured computing system. Element 1008 is then operable to invoke the send API method (as discussed above) to transmit the prepared acknowledgment back to the requesting transmission manager. The transmission of the acknowledgment message is performed in a manner identical to that of a job transaction in that the send method of the transmission manager portion of the invention is invoked. However, in transmission of an acknowledgment message, no acknowledgment therefore is required from the other side. This avoids an essentially infinite loop of acknowledgments "ping-ponging" between the two systems.

Figure 11:
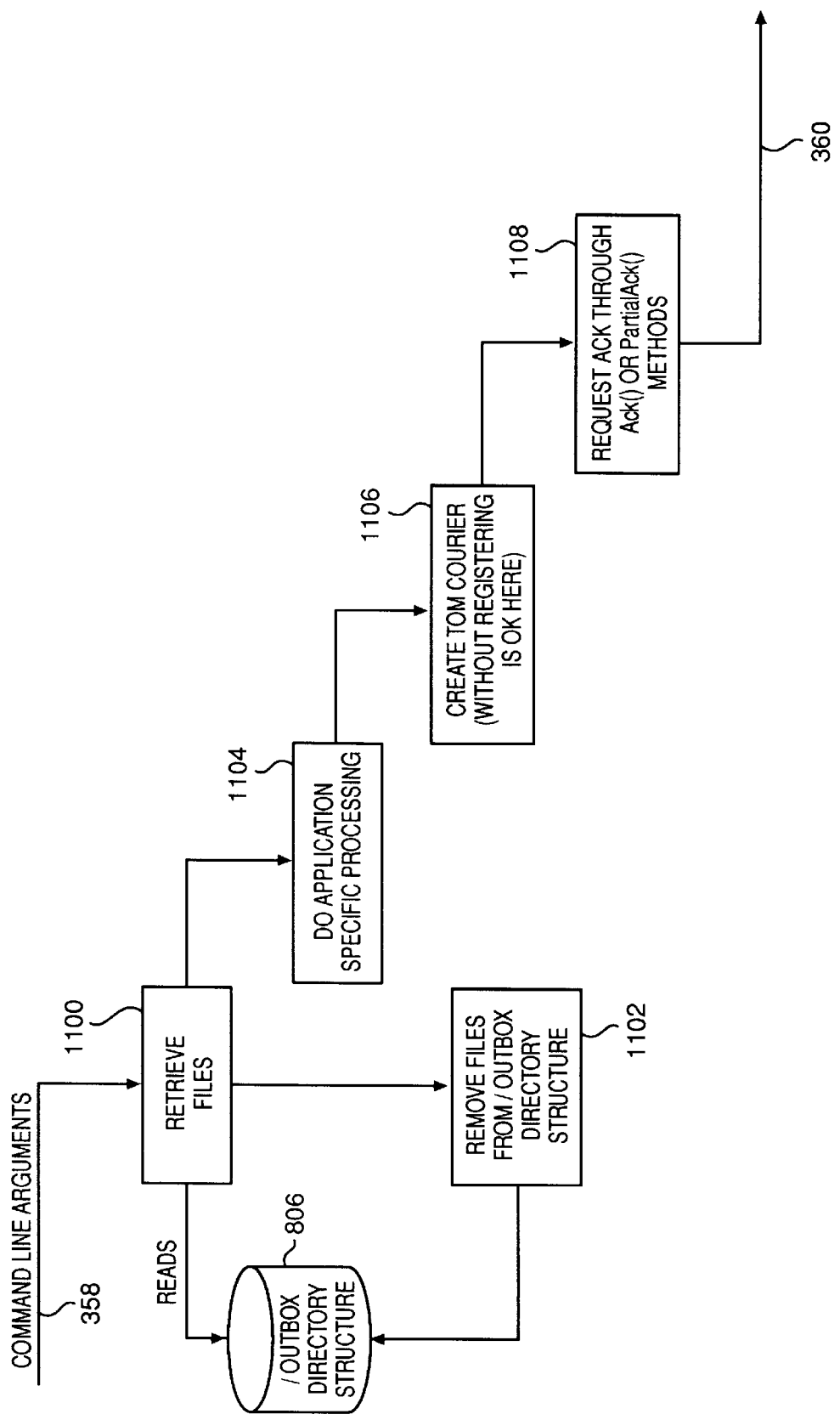
FIG. 11 is a block diagram depicting additional detail of data flow of FIG. 3 within the receiving process.

FIG. 11 is a data flow diagram describing additional details of the operation of the receiving application 308 of FIG. 3. The receiving application preferably receives a transaction in the form of a command line to start the application (executed by a shell or command interpreter of the computing system) and parameters for operating the application. The parameters may, for example, identify the files of data transmitted from the sending application by their respective original file names in the OUTBOX directory structure path.

The receiving application then performs whatever application specific processing is required as depicted in element 1104. Element 1106 then creates a courier object to communicate with the reception manager. The ACK method of the courier object is then invoked by element 1108 to cause an acknowledgment message to be sent back to the sending process. The ACK method communicates the ACK request to the reception manager via IPC communication path 360.

Those skilled in the art will recognize that the receiving process may acknowledge the transmission from the sending process at any time in its processing. In other words, the semantic interpretation of the ACK message is up to the design of the receiving process. The ACK message may be sent as soon as the receiving process is invoked to indicate merely that the job has been received. The ACK message may sent following precessing of the data by the receiving process to indicate that the requisite operations have been completed. Alternatively, the sending process may indicate in job parameters that no acknowledgment is required for the transaction. In such a case, the receiving process need not generate and ACK message at all. Still another option for the communicating processes is to utilize the partial ACK method of the invention. The partial ACK method generates a different acknowledgment message which may be useful for indicating partial success of the transaction to the sending process. In the preferred embodiment, the receiving application determines when to send the ACK message and determines whether it is a normal ACK or a partial ACK. The sending application simply awaits receipt of such ACK messages and interprets them accordingly as indicative of completion or only partial completion of the transaction, respectively.

Methods of the Preferred Embodiments

Figure 14:
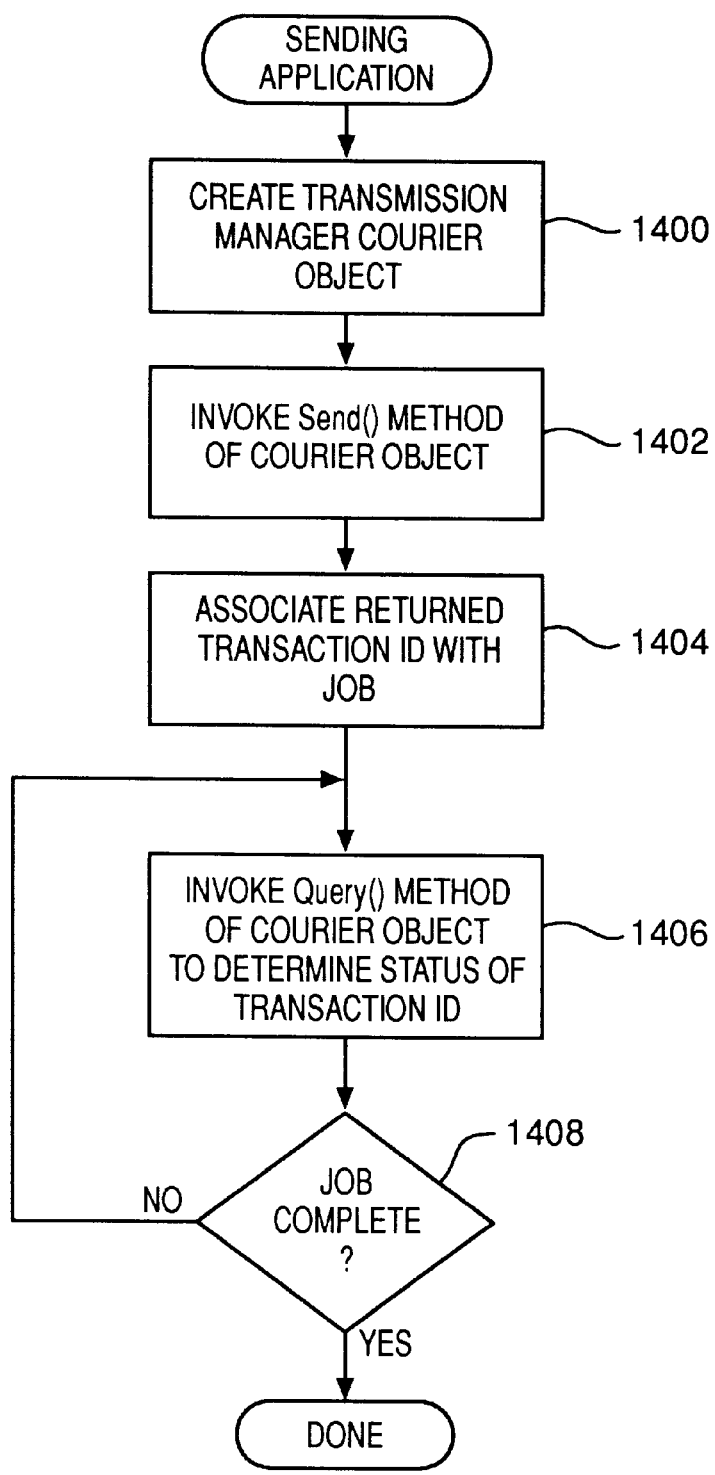
FIG. 14 is a flowchart describing operation of methods of the present invention operable within the sending application process.

FIG. 14 is a flow chart describing methods of the present invention operable within a sending application. As noted herein above, a sending application invokes services of the present invention by calling functions defined in an application programming interface (API) of the present invention. The sending application specifically invokes API functions relating to the transmission manager portion of the present invention. As described further herein below, the interface between sending application, transmission manager, and other components of the present invention, are described in terms of object oriented design paradigms. Those skilled in the art will readily recognize other programming design paradigms (i.e., purely procedural paradigms, etc.) which may be utilized to implement the features of the present invention. Further, those skilled in the art will recognize the equivalence of implementations using custom circuit designs for various features of the present invention as compared to software designs operable on general-purpose computing devices.

At element 1400, the sending application first invokes an API function of the transmission manager to create a transmission manager courier object. The courier object is essentially the means by which the sending and receiving processes request services of the manager of the present invention. The API functions (described further herein below) are methods of this courier object. Element 1402 is next operable to invoke the send method of the courier object. A transaction ID is returned from the send method invocation for use in subsequent tracking of the progress of the job. The transaction ID so returned is saved by operation of element 1404. Subsequent query operations to determine the status of the job use the saved transaction ID to identify the job for which status is requested. Next, elements 1406 and 1408 are iteratively operable to determine when the job is successfully transmitted to the destination receiving application. In particular, element 1406 is operable to invoke the query method of the courier object to determine the present status of the job as identified by the saved transaction ID associated with the job. Element 1408 is then operable to determine whether the query method invocation results in a status indicative of job completion. If the job is completed, the processing of FIG. 14 is completed. If the transmission job is not yet completed, processing continues by looping back to element 1406 to repeat the query process.

Those skilled in the art will readily recognize that a number of jobs may be associated with a particular courier object. In other words a plurality of jobs may be directed to a single receiving application via a single transmission manager courier object (created by element 1400) and then iteratively invoking elements 1402 and 1404 to define a new job and transmit that job. Furthermore, those skilled in the art will recognize that the transmission, once initiated by processing of element 1404, continues asynchronously with respect to the sending application. The sending application may proceed with any other processing desired and invoke the query method (element 1406 and 1408) at any later time to poll for the present status of any pending transmission jobs.

Figure 15:
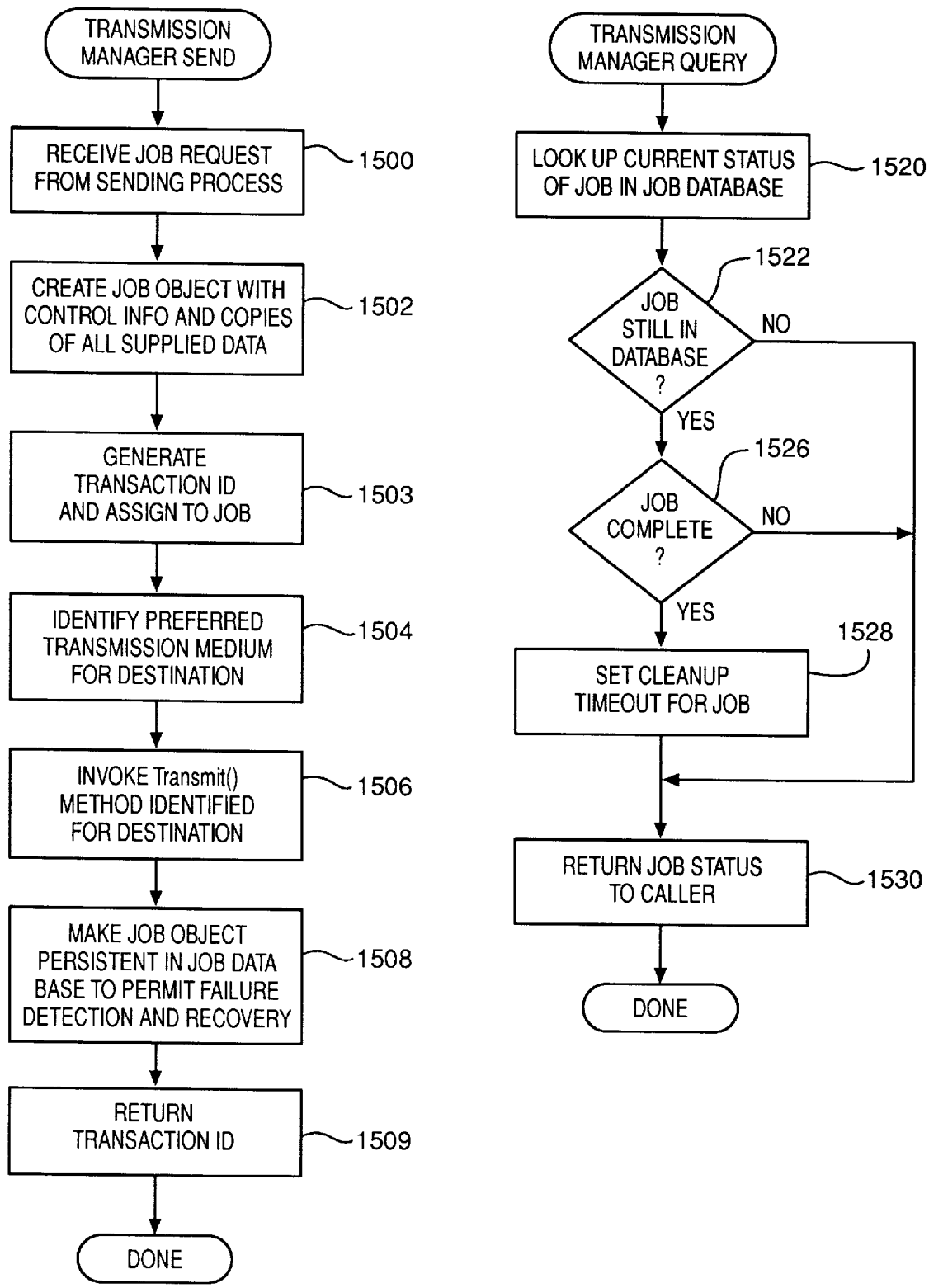
FIG. 15 is a flowchart describing operation of methods of the present invention operable within the transmission manager.

FIG. 15 is a flow chart describing methods of the present invention operable within the transmission manager for coordinating and managing robust, reliable exchange of data with a corresponding reception manager operable within a second secured computing system. The first flow chart (elements 1500 through 1508) describes the send method associated with courier objects of the transmission manager. The second flow chart (elements 1520 through 1530) describes the query method operable within the transmission manager courier objects.

Element 1500 is first operable to receive a send job request from the sending application process as described above with respect to FIG. 14. In response to receipt of such a job request, element 1502 is next operable to create a job object to control processing above this particular transaction job. Element 1502 is further operable to associate with the job object all required control information and copies of all supplied data files from the sending application process. Element 1503 then generates a unique ID (GUID) used as the transaction ID (also referred to herein as a job ID). The job ID is used by all cooperating processes to identify a particular transaction or job in the job database.

Element 1504 is then operable to identify the preferred transmission medium associated with the identified destination receiving application. The database file associated with the transmission manager includes information identifying one or more transmission media appropriate for communicating with an identified destination. Element 1504 is therefore operable to select a preferred such medium. The preferred medium may be selected in accordance with performance standards of the various media or other standards applicable to particular environments. For example, it may be preferred initially to select a high-speed network connection available for transmission of data files associated with a particular transmission job. However, if the network communication link is unavailable for any reason, a slower manual transmission medium (i.e. magnetic or optical storage medium) may be selected as an alternate communication medium.

Element 1506 is then operable to invoke the transmission method for the identified destination. As noted herein above, the transmission method may include techniques appropriate to the particular medium for encoding and/or encrypting the job data files before transmission through the selected medium. For example, certain transmission media may require a large data file to be broken into multiple segments (i.e., some email protocols require large messages to be so decomposed into smaller segments). Or, for example, other transmission media may require that binary information be encoded into displayable ASCII text for transmission over the selected medium. All such encoding and/or encrypting is therefore preferably embodied within the processing of element 1506 as required for the particular selected medium.

Element 1508 is then operable to make the job object created by element 1502 persistent by storing the job object information in the transmission job database. Making the job object persistent enables failure detection and recovery techniques to be applied to the transmission of the job. Finally, element 1509 is operable to return the generated transaction ID to the calling process for later use in determining the status of the job.

Elements 1520 through 1530 describe the query method of the transmission manager of the present invention. Specifically, element 1520 is first operable to look up the current status of a pending job as presently recorded in the transmission job database. Element 1522 is next operable to determine whether a record identifying the job is so located within the job database. If the job is no longer recorded in the job database (i.e., the job has been previously completed and removed from the database), element 1530 is next operable to return an error job status to the sending process thereby completing processing for the method. The "job no in database" error status so returned informs the calling process that the job has been completed and thence removed from the database or that the transaction ID used does no correspond to any known job.

If element 1522 locates the identified job in the transmission job database, element 1526 is next operable to determine whether the present status as recorded in the job database indicates that the job has completed. If the job has been completed, element 1528 is next operable to remove the job entry from the transmission job database. In either case, processing then continues with element 1530 to return the present job status (i.e., complete or not yet complete) to the calling (sending) application process thereby completing processing of the method.

As noted herein above, in the preferred embodiment, completed jobs remain in gathering and analysis. A cleanup timeout period is associated with the completed job entry in the database such that time out processing methods (described below) will eventually delete the completed job entry from the job database.

Figure 16:
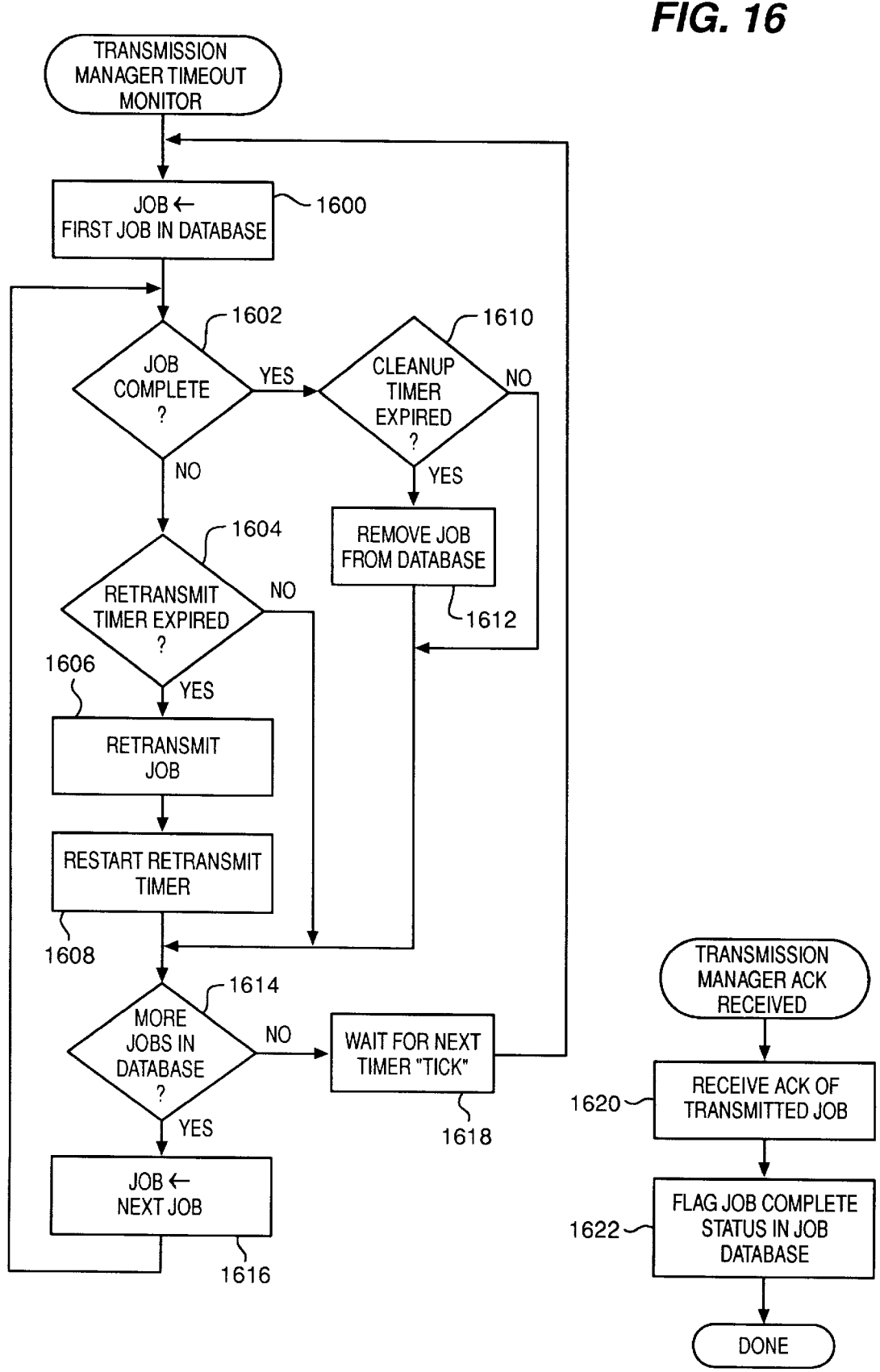
FIG. 16 is a flowchart describing operation of methods of the present invention operable within the transmission manager.

FIG. 16 is a flow chart describing daemon (background) processes operable within the transmission manager of the present invention. In particular, elements 1600 through 1618 describe the processing of the timeout monitor daemon operable to detect a timeout condition in a pending or completed transmission job. Elements 1620 through 1624 described a method, asynchronously initiated, to detect and process the receipt of an acknowledge message from the reception manager in the second secured computing system.

Element 1600 is first operable to initialize a local pointer variable (JOB) to point to the first pending job in the transmission job database. Elements 1602 through 1616 are then iteratively operable to determine if the job presently pointed to buy the local pointer variable has timed out waiting for a timed event. Specifically, element 1602 first determines whether the job has a completed status. If not, element 1604 next determines whether a predetermined retransmit timeout period associated with the job has expired. As noted above, the retransmit timeout period for each job may vary depending upon the selected transmission medium and other parameters of the transmission manager. If element 1604 determines that the timeout period has expired, elements 1606 in 1608 are then operable to re-transmit the job. Specifically, element 1606 initiates retransmission of the job for which the retransmit timeout period has expired. Element 1608 then resets the retransmit timeout period for the job in view of the initiation of retransmission of the job. Processing then continues with element 1614. If element 1604 determined that the retransmit timer has not expired, processing continues with element 1614.

If element 1602 determines that the job status is complete, element 1610 is next operable to determine whether the cleanup timeout period has expired for the job. As noted above, in the preferred embodiment, completed jobs remain in the job database for a period of time (the cleanup period) to permit post processing statistical analysis or other analysis or reporting functions. The cleanup period is preferably configurable to permit a system administrator to determine the needs of the installation. If the cleanup period has expired, element 1612 is operable to remove the completed job record from the job database. Processing then continues with element 1614.

Processing then continues with element 1614 to determine whether additional job records need be processed in the transmission job database. If more job records are present in the transmission job database, element 1616 is next operable to set the local pointer variable to a next job entry in the job database. Processing then continues by looping back to element 1602 to inspect the status for this next job. If element 1614 determines no further jobs are pending in the transmission job database, element 1618 is operable to delay a predetermined period of time (i.e., a tick of the timeout monitoring clock). Processing then continues by looping back to elements 1600 to review the timeout status of all remaining job records in the transmission job database.

Elements 1620 and 1622 are operable as a daemon process within transmission manager to recognize and process the asynchronous receipt of an acknowledgment message from the reception manager operable in the second secured computing system. Specifically, element 1620 is operable to receive the asynchronously transmitted acknowledgment message (ACK). Element 1622 is then operable to update the completion status for the corresponding transmission job in the transmission job database in accordance with the newly received acknowledgment.

Figure 17:
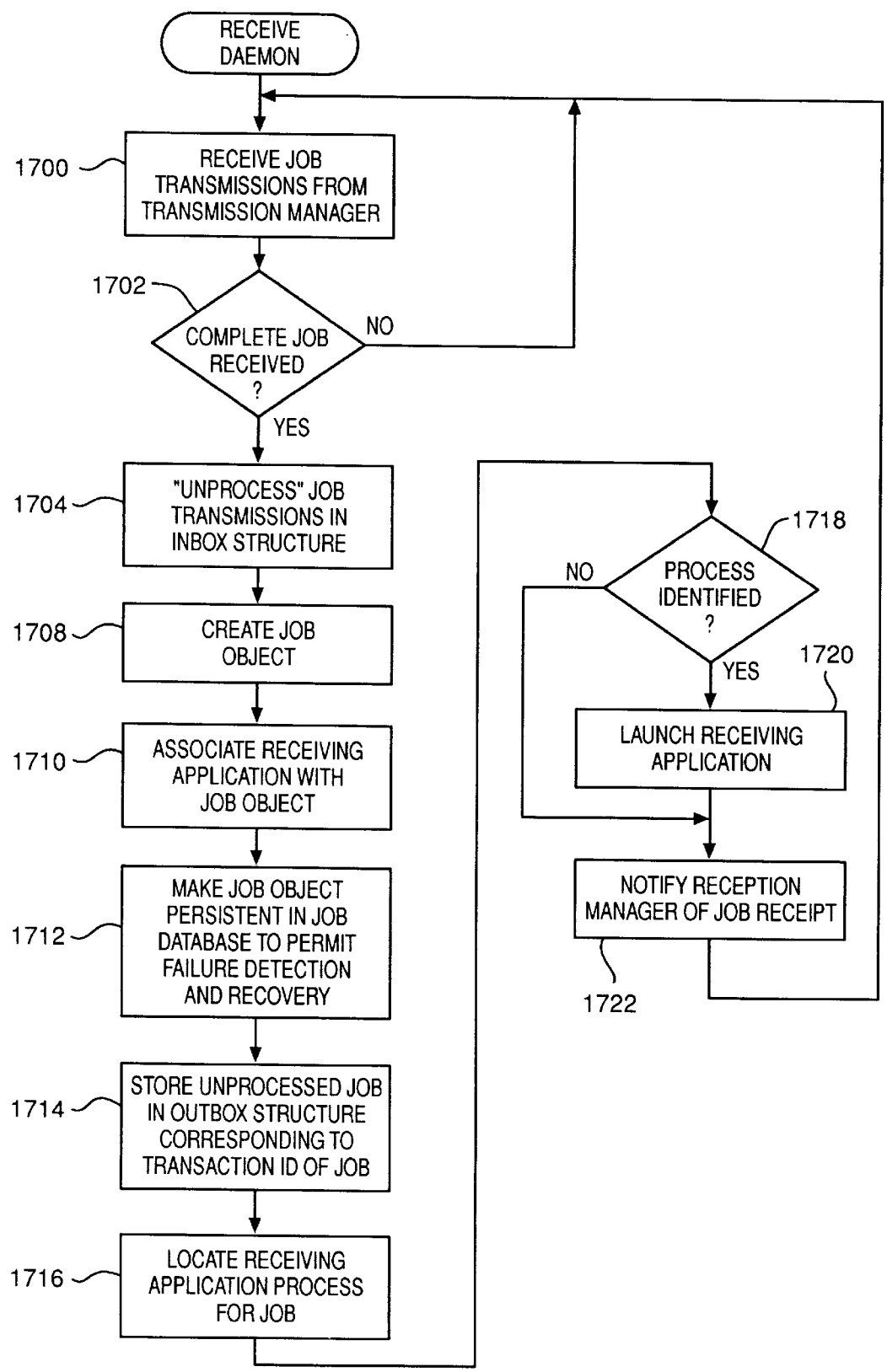
FIG. 17 is a flowchart describing operation of methods of the present invention operable within the reception manager.

FIG. 17 depicts a flow chart of a method operable within the reception manager in the second secured computing system to receive transmitted data from the transmission manager operable in the first secured computing system.

Element 1700 is operable to receive a job transmission from the transmission manager. As noted above, depending upon the selected transmission medium, a single transmission job may be decomposed into a plurality of segments. Element 1700 is therefore operable to receive each such segment of a job. Element 1700 is further operable to store all such received segments in an INBOX structure for temporary retention until all segments have been received. The INBOX structure is a temporary heap storage or repository for holding the received segments of transmitted jobs. Each segment is stored in a named file, the name of which includes the transaction ID of the job to associate it with other segments of a particular transmission job.

Element 1702 is then operable to determine whether all segments of a particular job transmission have been received. If element 1702 determines that no complete job has yet been received and stored in the INBOX segment repository, processing continues by looping back to element 1700 to await reception of a complete transmission job.

If element 1702 determines that at least one complete transmission job presently resides within the INBOX repository, element 1704 is next operable to "unprocess" the received transmission job. As used herein, "unprocessing" preferably includes decoding of any encoded information, decryption of any encrypted information, and the combining related segments into their original files as defined by the transmission job parameters. As noted above, transmission jobs may be associated not only with a plurality of segments, but the plurality of segments may constitute a plurality of files associated with the transmission job. Element 1704 is therefore generally responsible for re-constructing the originally configured files as associated with the transmission job by the sending application process.

Element 1708 is then operable to create a job object as a repository of information regarding the completed transmission job. Element 1710 is next operable to associate the receiving application of the received transmission job with the created job object. Element 1712 is then operable to make the created job object persistent by storing it in the job database associated with the reception manager. So storing the received job object in a persistent received job database permits failure detection and recovery techniques within reception manager as described herein.

Element 1714 is then operable to store the unprocessed job (reconstructed into its original file structures) in an OUTBOX directory structure corresponding to the transaction ID of the transmission job. Each transmission job received and unprocessed by elements 1700 through 1704 is preferably stored in a unique OUTBOX directory structure associated with that specific transaction.

Element 1716 is then operable to locate the receiving application process corresponding to this transmission job. As noted above, parameters of the job preferably include identification of a particular receiving process or application intended to further process the received job. Element 1718 is then operable to determine whether an application and has been so identified as associated with the transmission job. If none has been selected, processing continues by looping back to element 1700 to await reception of further segments associated with further transmission jobs.

If a receiving application or process has been identified and located in association with the received job transmission, element 1720 is then operable to launch the identified receiving application to process the received job data. The receiving application is launched with a command line and associated parameters identified as job parameters and associated with the transmission job. Processing then continues by looping back to element 1700 to await reception of further segments of other transmission jobs.

Figure 18:
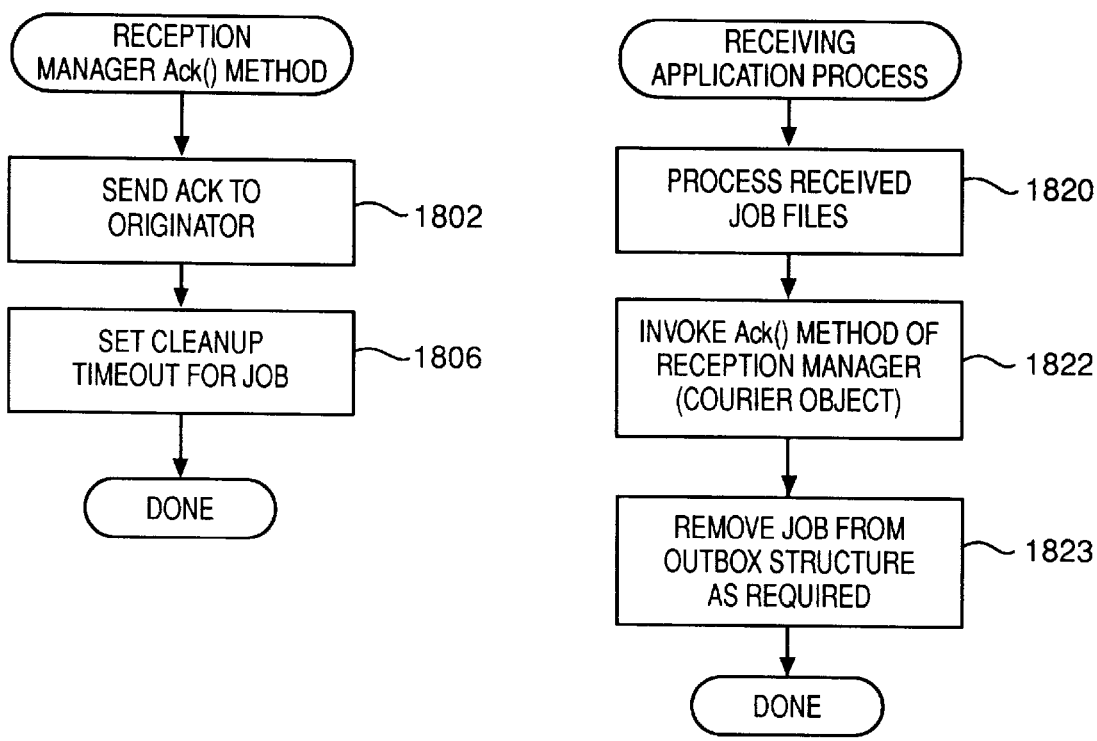
FIG. 18 is a flowchart describing operation of methods of the present invention operable within the reception manager and the receiving application.

FIG. 18 depicts flow charts of methods of the present invention operable within the reception manager in the second secured computing system. Element 1802 through 1806 describe an acknowledge method operable within reception manager in response to invocation by receiving application following completion of its processing of the received transmission job. Element 1802 is operable to send an ACK message originating transmission manager.

As noted above, acknowledgment aspects of the present invention are substantially symmetric with respect to the transmission manager and reception manager of the present invention. In this case, the acknowledgment request is generated by the receiving application to indicate to the transmission manager that the transmitted job has been received and processed. The transmission of the ACK message uses the same objects and methods discussed above with respect to the transmission manager. As noted above, the transmission manager and reception manager are preferably a single module providing the API functions of both management features in both systems. The acknowledge method therefore send its ACK message in essentially the same way the sending application sends the original transaction—by invoking the send method of a courier object. In the case of the acknowledge method transmission, the transmitted message is sent without requesting an acknowledgment from the other side. Parameters of the job do not request an acknowledgment. This prevents an "infinite loop" of acknowledgments causing further acknowledgments, etc.

Element 1806 is next operable to remove the job from the receive job database. Having completed all processing of the received transmission job, no persistent storage is required relating to the particular received job transmission. As noted above, completed jobs are "removed" from the job database after a configurable timeout period to permit statistics gathering and other analysis of the communication paths.

Elements 1820 through 1823 are operable within the identified receiving application or process designated to process the particular received job transmission. Specifically, element 1820 is operable to perform whatever application-specific processing is required for the received job transmission data files. Element 1822 is then operable to invoke the acknowledge method of the reception manager as discussed above. The acknowledge message so generated verifies reception and processing of the job data to the originating (sending) process. As noted above, those skilled in the art will recognize that the receiving process may defer the generation of the acknowledge to any point in its processing deemed appropriate for the transaction. The acknowledge may be generated as soon as the data is received or after any point in the application specific processing of the received data.

Lastly, element 1823 is operable within the receiving application to remove the job data files from the OUTBOX directory structure created by the reception manager. The receiving application may delete this directory structure at its discretion or, if appropriate, leave the structure for subsequent processing following the ACK message returned to the sending application. Well known "garbage collection" techniques may be employed by the reception manager of the present invention to subsequently remove OUTBOX directory structures inadvertently left in the system by ill-behaved receiving application processes.

API Definitions of the Preferred Embodiments

As noted above, the transmission manager and reception manager of the present invention are preferably implemented as object oriented API modules to be invoked by sending and receiving applications desiring to communicate between secured systems. The following API definitions represent the best presently known mode of practicing the invention.

The features of the present invention described above with respect to the transmission manager and the reception manager are provided as an API linked with the sending and receiving applications. The management features are preferably implemented in conjunction with lower level protocol control modules referred to as Transport Office. The management features are therefore referred to as Transport Office Manager (or by the acronym TOM). The API provides an object oriented interface to the features of the present invention. The sending and receiving applications are therefore linked with the API library. Desired objects are instantiated by the applications and methods associated with those objects are invoked to perform the desired transaction management.

TomIL Classes: An Overview

The classes described in this document represent the complete external interface for the TOM Interface Library (TomIL). The TomIL is itself an interface for communicating with the Transport Office Manager (TOM). Users of the TomIL instantiate TomIL objects representing transport protocols, transport policies, and jobs, and then pass those objects to the communications hub of TomIL: CTomilCourier. The CTomilCourier object then communicates directly with TOM via sockets. Once transactions have been sent via the CTomilCourier, those transactions can be queried for status, thus creating other TomIL objects.

TomIL objects all share the basic characteristic that they are handled as pointers at the client level. There is no way to construct any TomIL object by simply using the object's constructor. Since objects are all accessed at the client level through pointers, that means no copy constructors or assignment operators have been provided for TomIL objects exposed to clients. There has been provided, however, a virtual copy constructor for all objects that are not treated as Singletons(127). The notation Singleton(127) refers to the singleton design pattern described in the book: *Design Patterns by Gamma*, Helm, Johnson, and Vlissides. By convention, Prototype(117) would refer to the prototype design pattern in the same text.

There are three basic types of TomIL objects:

Type I Objects: These objects are objects that are created via the static "Create( )" method accompanying the object's class or via a return value from a CTomilCourier method, such that when the object is created, a full copy of the object comes into existence and ownership of that object passes from TomIL to the client. This means that the client is responsible for deleting the memory associated with said object once the object is no longer useful.

For example:

CTomilPolicy* policy=CTomilPolicy::Create(10, 10, 5, TOMIL_ACK);
// Use the object here to do whatever
delete policy;

OR

CTomilTransactionID* TransactionID;
CTomilCourier* Courier=CTomilCourier::Instance( );
TransactionID=Courier->Send(job, app);
// Use the transactionID object here to do whatever.
delete TransactionID;

Type I Objects all have virtual copy constructors associated with them. This is how clients can make full, deep copies of an object given that the client simply has a pointer to the object. All virtual copy constructors are called "clone()" and always take no parameters.

For example:

```
CTomilPolicy* policy1=CTomilPolicy::Create(10, 10, 5,
    TOMIL_ACK);
CTomilPolicy* policy2;
// Create a full, deep copy of the object policy1 which is now
    pointed to by the
// pointer "policy2".
// These objects are fully independent of each other and each
    can be deleted
// without affecting the other.
policy2=policy1->clone( );
// Make sure to also delete policy2 once you're finished with
    it or you will create
// a memory leak.
```

Type I Objects include:

CTomilPolicy: create via CTomilPolicy::Create( ) or clone( )
CTomilJob: create via CTomilJob::Create( ) or clone( )
CTomilApplication: create via CTomilApplication::Create( ) or clone( )
CTomilAddress: create via CTomilAddressFactory's or CTomilAddressStrategy's or clone( )
CTomilTransactionIDIterator: create via CTomilCourier::GetAllIDs( ) or clone( )
CTomilTransactionID: create via CTomilTransactionID::Create( ) or clone( )
CTomilAddressStrategy_SpecificProtocol: create via CTomilAddressStrategy_SpecificProtocol::Create( ) or clone( ).
CTomilTransactionStatus: create via CTomilCourier::Query( ) or clone( )
CTomilVersion: create via CTomilVersion::Create( ) or clone( )
CTomilError: created via "catch" statements or clone( )

Type II Objects: These objects are referred to as Singleton (127) objects. A Singleton(127) object ensures that a class has only one instance and provides a global point of access to it. Objects that are Singletons(127) are represented as pointers throughout a user's code, and the pointer to a Singleton(127) is delivered through its Instance( ) method. Pointers to Singletons(127) are owned by the Singleton(127) and will be disposed of properly when the application using the Singleton(127) exits. No clean-up intervention is needed on the part of the user of the Singleton(127). As a matter of fact, clients must explicitly NOT try to delete any pointers which point to Singletons(127).

For example:

```
{
CTomilCourier* courier=CTomilCourier::Instance( );
courier->Send(job, app);
}// local scope
```

// At this point in the code the CTomilCourier object still exists and may be
// referenced again by simply calling its ::Instance( ) method. The object will
// be destroyed automatically when the entire application exits.

TomIL Type II objects include:

CTomilAddressFactory (abstract base class)
CTomilAddressFactoryEmail
CTomilCourier Type III Objects: These objects look and act pretty much like Type I objects: they have a clone( ) method and are referred to via pointers, but they are instantiated by factory or strategy methods because users of these objects don't have enough information exposed to them to construct the objects themselves.

For example:

```
CTomilAddress* address;
CTomilAddressStrategy_SpecificProtocol* strategy=
    CTomilAddressStrategy_SpecificProtocol::Create( );
address=strategy->CreateAddress("atl");
// Use the address object here for whatever...
delete address;
```

TomIL Type III objects include:

CTomilAddress is the only Type III object in the TomIL.

TomIL Error Strategy

The error strategy throughout TomIL is for methods to throw CTomilError objects whenever exceptional conditions are encountered, however, TomIL constructors will never throw errors. Any TomIL method exposed to the user that can throw a CTomilError object will be documented as such. It is strongly recommended that any TomIL method that can throw an error be surrounded with Try/Catch code whenever it is called. Always catch CTomilError objects by pointer.

For example:

```
try
{
strategy->CreateAddress("bad_address");
}
catch (CTomilError* e)
{
// process error here
delete e;
}
```

TomIL Address Books

An address book is a file containing a textual collection of addresses and policies that can be used by TomIL. Addresses and policies are spelled out in their entirety and then given a short-hand alias by which they can be referred. Address books are completely optional when using TomIL. They merely provide a short-hand access to well-known and often used addresses and policies. TomIL clients are welcome to construct their own addresses and policies at run time using TomIL objects.

For example, a short-hand alias for the Atlanta Response Center might be the string "ATL", and its full email address might be respCenter@atlhub.atl.hp.com. A short-hand alias for the default policy used to send email to the address ATL might be the string "DefaultPolicy" and the policy parameters might be (60;5;60;1).

Address books are preferably human-readable text and can be created with any textual editor. A standard text editor or simple web-based address book construction tool may be used to construct the file.

TomIL address book syntax

A TomIL address book can be named any legal file name for the operating system you're using, but all TomIL address books should have the suffix ".abk" so they can be easily identified as TomIL address books.

Address book comments are preferably full-line comments only and may be placed on any full line of the address book. Comments are denoted by having a "#" character as the first character on the line.

For example:

This is a comment line.

Comments are preferably not embedded within functional lines in your address book. Blank lines: Blank lines may be inserted anywhere in the address book. All blank lines will be ignored. Delimiters: The field delimiter in a TomIL address book is always the character ';' (semi-colon). It is not necessary to end lines in an address book with a ';'. The end-of-line character is plenty to denote the end of a field. Spaces: Do NOT embed spaces in address headers, address names, or policy names. Section headers: The format for a section header is "*H*;name".

For example:

This is the header for the Atlanta section
*H*;ATL
Addresses: An address section is delimited by the line "--Addresses--"

For example:

--Addresses--
Individual addresses (Email): Each email address has the format:
"Email;address@address"

For example:

Sample email address. Any legal email address can follow the ";"
on the following line
Email;rc@atl.hp.com
Policies: A policy section is delimited by the line "--Policies--".
For example:

--Policies-

Individual policies: Each policy has the format:

"PolicyName;TimeOut;NumRetries;TBR;Ack"
For example:

The following policy is named "DefaultEmail" and has a TimeOut
value of 60, a Number-of-retries value of 5, a time-between-retries
value of 30, and is acknowledged (1 instead of 0)
DefaultEmail;60;5;30;1

An address book preferably has exactly one Email address defined for each section header, and as many uniquely named policies as desired for the same header. An address book may have as many uniquely named sections as needed.

Sample TomIL address book

The following is a valid sample TomIL address book.

```

# This is a Sample TomIL Address Book

##################################################
# First-choice header for Atlanta
##################################################
*H*;Atl-primary
--Addresses--
Email;rc@atl.hp.com
--Policies--
LargeEmail;500;4;300;1
MediumEmail;50;4;30;1
SmallEmail;5;4;3;1
##################################################
# This is a header for an alternate Atlanta address
##################################################
*H*;Atl-secondary
--Addresses--
Email;rc_secondary@atl.hp.com
--Policies--
LargeEmail;300;2;30;1

# etc....

```

TomIL Use Model

The TomIL is a simple library to use. Basic C++/OO (object oriented) paradigms are followed in using the TomIL with an application process (sending or receiving application). Certain objects in TomIL are created on the heap. It will be noted below which of these heap objects belong to TomIL and which objects have their ownership transferred back to the client. The calling process is responsible for deleting all heap objects that TomIL transfers to the client process.

Overview

The basic function of the TomIL is to gather data and parameters, packaging them into objects that funnel through the communication gateway to TOM, namely the CTomil-Courier object. The following sequence is the same basic sequence all client applications will follow to communicate with TOM via TomIL. Each communication with TOM is referred to as a "transaction", and each transaction can contain one or more files to be transmitted.

1) The application "registers" itself with TomIL by creating a CTomilApplication object. This object is then passed to CTomilCourier methods (Send( ), GetAllIDs( )).

2) The application needs to decide if a TomIL address book will be used. There is no problem inter-mixing the use of run-time address/policies with those retrieved from address books, but if an address book is to be used, then its location needs to be set as soon as possible in the application if the application is not going to use the default address book location. Static methods on the CTomilApplication object are used for this purpose. Address book locations can be set and reset anywhere in the application, but the client must make sure to have the proper address book location set before using any CTomil object that takes an address book alias as a parameter. If the address book location is in error, then CTomilError objects will be thrown when any method that uses an address book alias is called.

3) The application must create a CTomilPolicy object to use for its transaction. This object can be created at run-time by passing exact parameters to the CTomilPolicy::Create( ) method, or by fetching parameters from an address book by using the CreatePolicyFromAB("alias", "alias") method. Either way is equally valid. Neither is preferred over the other.

4) The application must create a CTomilAddress object to use for its transaction. Creating this object is the single most potentially confusing part of using the TomIL. CTomilAddress objects are riot distinguished by protocol at the client level (i.e., an email address object looks just like an FTP address object at the client level). It's the internal implementations of these objects that distinguish them. For the first release of TomIL, there is only one supported protocol: email, but there will be others in future releases. A great deal of effort has been designed into TomIL to shield clients from differences incurred by different transport protocols. Email addresses look wildly different from FTP addresses, and both are completely different from HTTP addresses. For this reason, clients cannot directly create generic CTomilAddress objects with protocol-specific implementations. Factories or strategies are needed to accomplish this.

A CTomilAddressFactory is a low-level way to create a CTomilAddress object. In particular, a CTomilAddressFactoryEmail can be instantiated and then its CreateAddressFromAB("alias") method or CreateEmailAddress("actual_address") method can be invoked to create a CTomilAddress with an email-specific implementation. The latter of these two methods is the only way to create a CTomilAddress object when the application has an actual email address. Using a CTomilAddressFactory to create a CTomilAddress object is not recommended because it ties client applications to specific TomIL address protocols when the client is compiled. Client applications will be much better served to relinquish all address protocol decision matters to TomIL.

Using a CTomilAddressStrategy is the preferred way to construct CTomilAddress objects. Strategy objects in general encapsulate algorithms allowing them to vary independently from the clients that use them. An address strategy is an algorithm that computes the best possible address type for the client to use given the constraints passed to the strategy. For the first release of TomIL, there is only one address strategy, and it is extremely simple: use email protocol. The CreateAddress("alias") method on the CTomilAddressStrategy_SpecificProtocol object is how a CTomilAddress object is created. If client applications get in the habit of using address strategies instead of specific address factories, then they will remain completely divorced from any specific transport protocol that TomIL can add in future releases, thus allowing the client application to always be poised to take advantage of new protocol enhancements made to strategies without ever having to re-compile.

5) After CTomilAddress and CTomilPolicy objects have been created, they are passed to a CTomilJob object. It is through the AddFile( ) method of this object that files are grouped into a single job/transaction, all being sent according to the policies of the specific CTomilPolicy object to the address of the specific CTomilAddress object.

6) Once a CTomilJob has been created, that job is submitted to TOM via the Send(job, app) method on a CTomilCourier object. The Send( ) method will return a new CTomilTransactionID object. This object identifies the transaction requested of TOM and is the identifying object used for future queries of TOM regarding this specific transaction. This object may be passed to the Query(ID) method of a CTomilCourier which will return a CTomilTransactionStatus object that relays the status of the transaction specified by the given CTomilTransactionID object. The CTomilTransactionStatus object has many different Get( ) methods which allow clients to query different aspects of a given transaction.

Sample Code

There are 2 sample pieces of code that follow. The first is a valid sample TomIL client application. It follows the steps listed above in the section "Overview". The second is a sample Tom receiver.

```
#include <string.h>
#include <iostream.h>
#include <CTomilApplication.h>
#include <CTomilPolicy.h>
#include <CTomilAddress.h>
#include <CTomilAddressFactoryEmail.h>
#include <CTomilAddressStrategy_SpecificProtocol.h>
#include <CTomilJob.h>
#include <CTomilTransactionID.h>
#include <CTomilCourier.h>
#include <CTomilTransactionStatus.h>
#include <CTomilTransactionIDIterator.h>
#include <CTomilError.h>

// NOTE: The name of the address book we're using is
    passed into this
// program. The path is specific to which ever platform we're
// on: either NT or UX.
void main(int argc, char* argv[ ])
{
    char* ab; // The path of the address book.
    ab=new char[strlen(argv[1])+1];
    strcpy(ab, argv[1]);

//
// Step 1 as written in the ERS: register this application.
//
CTomilApplication* app=CTomilApplication::Create
    ("myApp",
    "myVersion",
    "myID");

//
// (optional) Step 2 as written in the ERS: set the location
// of an address book.
try
{
    CTomilApplication::SetAddressBookName(ab);
}// try
catch (CTomilError* e)
{
    cout<<e<<endl;
    delete e;
}// catch //
// Step 3 as written in the ERS: create a CTomilPolicy
// method 1, direct parameters
CTomilPolicy* policy1=CTomilPolicy::Create(60, 5, 30,
    TOMIL_ACK );
//
```

```
// Step 3 as written in the ERS: create a CTomilPolicy
// method 2, use CreatePolicyFromAB( )
CTomilPolicy* policy2=0;
try
  {
  policy2=CTomilPolicy::CreatePolicyFromAB("Atl-
     primary",
     "LargeEmail");

}// try
catch (CTomilError* e)
  {
  cout<<e<<endl;
  delete e;
  }// catch

// Since policy2isn't used except for demo purposes, delete
   it.
delete policy2;
//
// Step 4 as written in the ERS: create a CTomilAddress
   object
// method 1: use an actual address and
// factory
// NOT RECOMMENDED.
//
CTomilAddress* address1;
CTomilAddressFactoryEmail* emailFactory=
   CTomilAddressFactoryEmail::Instance( );
address1=emailFactory->CreateEmailAddress
   ("myaddr@atl.hp.com");

// Since address1 isn't used except for demo purposes, delete
   it.
delete address1;

//
// Step 4 as written in the ERS: create a CTomilAddress
   object
// method 2a: use a CTomilStrategy.
// This method is still not recommended
// as it passes a specific address
// factory to the strategy.
// Notice the subtle difference here in the CTomilAddress-
   Factory
// pointer. The previous example had a specific
// CTomilAddressFactoryEmail pointer, this example MUST
   use a generic
// CTomilAddressFactory pointer because it's being passed
   to a
// CTomilStrategy.
CTomilAddressFactory* emailFactory2=
   CTomilAddressFactoryEmail::Instance( );
CTomilAddressStrategy_SpecificProtocol* addressStrat-
   egy;
addressStrategy=CTomilAddressStrategy_
   SpecificProtocol::Create(emailFactory2);
CTomilAddress* address2;
try
  {
  address2=addressStrategy->CreateAddress("Atl-
     secondary");
  }// try
catch (CTomilError* e)
  {
  cout<<e<<endl;
  delete e;
  }// catch // Since addressStrategy and address2 aren't used except for
   demo
// purposes, delete them.
delete addressStrategy;
delete address2;
//
// Step 4 as written in the ERS: create a CTomilAddress
   object
// method 2b: use a CTomilStrategy.
// This is the RECOMMENDED method to do
// this. Use the default constructor
// for the CtomilStrategy and you free
// the client from specific protocols.
//
CTomilAddressStrategy_SpecificProtocol* addressStrat-
   egy2;
addressStrategy2=CTomilAddressStrategy_
   SpecificProtocol::Create( );
CTomilAddress* address3;
try
  {
  address3=addressStrategy2->CreateAddress("Atl-
     primary");
  }// try
catch (CTomilError* e)
  {
  cout<<e<<endl;
  delete e;
  }// catch // Since we're finished with addressStrategy2, delete it.
delete addressStrategy2;

//
// Step 5 as written in the ERS: create a CTomilJob object
// then add files to the Job
// These file names are hard-coded simply as examples of
   files that
// exist. Client code should not look like this other than to
   take
// into consideration the differences between UX and NT file
   names.
#if defined(__WIN32)
   char* file="c:\\winnt\\system32\\ansi.sys";
#else
char* file="/usr/sbin/cron";
endif CTomilJob* job=CTomilJob::Create(address3, policy1);

// Add a file to the job. Call AddFile( ) as many times as you
   need.
try
  {
  job->AddFile(file);
  }// try
catch (CTomilError* e)
  {
  cout<<e<<endl;
  delete e;
```

```
}// catch

// We're finished with address3 and policy1, delete them.
delete address3;
delete policy1;

//
// Step 6 as written in the ERS: create a CTomilCourier
    object
// then use the Send(job) method.
//
CTomilTransactionID* TransactionID;

// Instantiate a CTomilCourier.
CTomilCourier* Courier=CTomilCourier::Instance( );
try
    {
    TransactionID=Courier->Send(job, app);
    }//try
catch(CTomilError* e)
    {
    cout<<e<<endl;
    delete e;
    }// catch // We're finished with our job at this point, so delete it.
delete job;

//
// Step 6 as written in the ERS: query a transaction
//
CTomilTransactionStatus* status;
status=Courier->Query(TransactionID);

time_t timeSent=status->GetTimeSent( );
cout<<"Time sent='"<<ctime(&timeSent)<<"'"<<endl;
// Now get the policy parameters for this particular Trans-
    actionID.
CTomilPolicy* policy;
policy=status->CreatePolicy( );
if (policy !=NULL)
    cout<<"Number of retries="<<policy->GetNumRetries(
        )<<endl;
else
    throw "some kind of error";

if      (status->GetCurrentTry(        )
        !=CTomilTransactionStatus::GetUnknownI( ))
    cout<<"Current Try="<<status->GetCurrentTry(
        )<<endl;

// Make sure to clean up objects when they are no longer
    useful...
delete policy;
delete TransactionID;
delete status;

//
// Bonus code: query the status of all your transactions
// use a CTomilTransactionIDIterator
//
CTomilTransactionIDIterator* IDIt;
CTomilTransactionStatus* status2=0;

IDIt=Courier->GetAllIDs(app);

IDIt->Reset( );

CTomilTransactionID* tid;
while(tid=IDIt->Next( ))
    {
    delete status2; // Prevent memory leaks.
    status2=Courier->Query(tid);
    cout<<"Status for job: ("<<tid->GetID( )<<")="
        <<status2<<endl;
    }// for delete IDIt;
delete status2;
// Don't delete tid because it just received a pointer assign-
    ment;
// there was never a new object created.
delete app;
}// main This is sample receiver code:

include <iostream.h>
#include <stdio.h>
#if !defined(_WIN32)
    #include <unistd.h>
#endif
#include <CTomilCourier.h>
#include <CTomilTransactionID.h>
#include <CTomilError.h>

// Arguments to this program are: guid, file [,file[,file...]]
void main(int argc, char* argv[ ])
    {
    char* guidin;
    if (argc<2)
        {
        cout<<"Error: bad arguments!"<<endl;
        exit(1);
        }// if
    guidin=argv[1];
    cout<<"Guid value passed in='"<<guidIn<<"'"<<endl;

// Instantiate a CTomilCourier.
    CTomilCourier* courier=CTomilCourier::Instance( );
    // Create a valid transactionID object from the guid passed
        in.
    CTomilTransactionID*            tid=
        CTomilTransactionID::Create(guidIn);
    // Loop through all the files passed in and validate each
        one:
    // check for existence.
    int arg=3; // This is where the file arguments start
    int valid_files=0;
    FILE* fp;

while (arg<=argc)
        {
        cout<<"File:'"<<argv[arg-1]<<"'";

if ((fp=fopen(argv[arg-1], "r"))==NULL)
            cout<<"does not exist!"<<endl;
        else
            {
```

```
    fclose(fp);
    valid_files++;
    cout<<"exists."<<endl;
    }// else arg++;
  }// while
char message[1024];

sprintf(message, "Data files sent: %d. Data files received:
    %d",
    argc-2, valid_files);
cout<<message<<endl;
// Now that we've validated the files, send a partial ack
    back for
// the guid.
// Partial acknowledgments are optional.
try
    {
    courier->PartialAck(tid, "Partial Ack. Processes
        pending.");
    }
catch (CTomilError* e)
    {
    cout<<e<<endl;
    delete e;
    }// catch
// Do whatever processing your app needs to do here.
// Now send a full acknowledgment.
try
    {
    courier->Ack(tid, message);
    }
catch (CTomilError* e)
    {
    cout<<e<<endl;
    delete e;
    }// catch
delete tid;
}// main
```

TomIL Application

The TomIL Application is an object that allows an application to "register" itself with TomIL. The application registers its name, version, and unique ID (if necessary) then passes this information along to TOM via the CTomilCourier methods Send( ) and GetAllIDs( ). This application information is used on the receiving side to identify what programs to start and where to put transmitted data or which transactionIDs to return.

Class-->CTomilApplication

The constructor for CTomilApplication is protected to force instantiation through the static CTomilApplication::Create( ) method.

Public Methods static CTomilApplication* Create(const char* appName,
    const char* appVer,
    const char* appID=0)

This is how clients create a CTomilApplication object. Ownership of the memory attached to the returned pointer will belong to the client. Make sure to delete this memory right before the pointer goes out of scope or a memory leak will be created.

appName: The name of the client application. Must not be null, o/w a CTomilError will be thrown.

appVer: The version of the client application. Must not be null, o/w a CTomilError will be thrown.

appID: The id of this particular invocation of the client application. This parameter is only necessary if multiple invocations of the application will be running at the same time. Important!!!—This id must be persistent and unique. That is to say that if this particular client invocation dies unexpectedly and then restarts, it must come up with the same id as it had before it crashed in order for this parameter to be useful. This parameter is completely optional and will probably be left blank in most all applications.

NOTE: Regarding the appName, appVer, and appID parameters, all embedded spaces will silently be replaced with the "_" (underscore) character. If any of the parameters contains characters other than (a–z, A–Z, –9, ., _) a CTomilError will be thrown.

CTomilApplication* clone( ) const
    This method is how a client creates a deep copy of this object. For example:
CTomilApplication* app2=app1->clone( );

const char* GetName( ) const
    This method returns the name that was used to create this CTomilApplication object. The returned pointer by this method points to memory owned by TomIL. No client cleanup is necessary.

const char* GetVer( ) const
    This method returns the version that was used to create this CTomilApplication object. The returned pointer by this method points to memory owned by TomIL. No client cleanup is necessary.

const char* GetID( ) const
    This method returns the ID that was used to create this CTomilApplication object. The returned pointer by this method points to memory owned by TomIL. No client cleanup is necessary.

static void SetAddressBookName(const char* newName)
    Clients use this method to set the location of the address book they want to use. Once the address book location is set it will be in effect for the entire client application until another call is made to SetAddressBookName( ) or a call is made to RestoreDefaultddressBook( ). SetAddressBookName( ) need never be called. If this method is never called, the default TOMIL address book will be used. See RestoreDefaultAddressBook( ) for its location. This method will throw a CTomilError object if the address book specified by "newName" is invalid.

newName: This is the fully qualified path name to an alternate address book the client wants to use. This path name must be of the appropriate type for the operating system on which the client's code is running. For example: /var/opt/foo/book.abk on HP-UX, or C:\myPath\foo\book.abk on NT. The suffix ".abk" is not necessary, but helps to identify (to the OS or an observer) the file as an address book.

static const char* GetAddressBookName( )
    Clients use this method to get the name of the current address book being used throughout the client application. The returned pointer by this method points to memory owned by TomIL. No client cleanup is necessary.

static void RestoreDefaultAddressBook( )
   Clients use this method to restore the current address book location being used throughout the client application to its original location. The default location of the TomIL address book is: /var/opt/TOM/lib/Tom.abk on HP-UX or C:\Tom\lib\Tom.abk on NT. This method will throw a CTomilError object if the default address book doesn't exist or is invalid.

TomIL Version
   The TomIL version object allows clients to determine the current version of the TomIL that they are using.

Class-->CTomilVersion
   The constructor for CTomilVersion is protected to force instantiation through the static CTomilVersion::Create( ) method.
Public Methods
static CTomilVersion* Create( )
   This is how clients create a CTomilVersion object. Ownership of the memory attached to the returned pointer will belong to the client. Make sure to delete this memory right before the pointer goes out of scope or a memory leak will be created.

CTomilVersion* clone( ) const
   This method is how a client creates a deep copy of this object. For example: CTomilVersion* ver2=ver1->clone( );

const char* Get (void)
   This method returns a character string representing the current version of TomIL being used. For the first release of TomIL, this string will always be "A.01.00". The returned pointer by this method points to memory owned by TomIL. No client cleanup is necessary.

TomIL Policy
   A policy is a packaging of all parameters that define attributes of how jobs can be sent using a CTomilCourier. A CTomilPolicy contains all of the transmission management variables for a particular job. Things like how long to wait before timing out, how many times to retry the transmission before generating an error, how long to wait before attempting a retry, and whether or not an acknowledgment is requested are contained in the policy class.

Class-->CTomilPolicy
   Policy variables can either be set explicitly in the CTomilPolicy::Create( ) method, or by passing a token to a method that enables a look-up of the corresponding values from a client's Address Book. The constructor for CTomilPolicy is protected to force instantiation through the static CTomilPolicy::Create( ) method.

enum ETomilAckType {TOMIL_NOACK, TOMIL_ACK}

Public Methods
static CTomilPolicy* Create(const int TimeOut=60,
   const int NumRetries=0,
   const int TBR=0,
   const ETomilAckType Ack=TOMIL_ACK)
   This is how clients create a CTomilPolicy object. Ownership of the memory attached to the returned pointer will belong to the client. Make sure to delete this memory right before the pointer goes out of scope or a memory leak will be created.

TimeOut: This tells TOM how long to wait for an acknowledgment before it considers a transmission to be timed out. It has a unit of "minutes" and will be limited to (0<=TimeOut<=14400) (10 days)

NumRetries: This tells TOM how many re-transmissions to make on a job should any of the previous transmission fail or time out. It is unit-less and will be limited to the range (0<=NumRetries<=20)

TBR: This tells TOM how long to wait between re-transmissions (Time Between Retries). It has a unit of "minutes" and will be limited to the range (0<=TBR<=2880) (2 days)

Ack: This tells TOM whether or not to expect an acknowledgment for a particular transmission.

CTomilPolicy* clone( ) const
   This method is how a client creates a deep copy of this object. For example: CTomilPolicy* pol2=pol1->clone( );

static CTomilPolicy* CreatePolicyFromAB (const char* address, const char* policyLabel)
   This method allows clients to create a policy object using attributes from pre-defined policies contained in a local address book. See CTomilApplication::RestoreDefaultAddressBook( ) for the default location of the address book. This method will throw a CTomilError if either parameter is bad or no TomIL address book exists. Ownership of the memory attached to the returned pointer will belong to the client. Make sure to delete this memory right before the pointer goes out of scope or a memory leak will be created.
address: The address token for which this particular policy is defined. For example: "atl".

policyLabel: The name of the policy token. For example "Hat-email-policy".

const int GetTimeOut ( ) const
   This method returns the time-out value for the given policy.

const int GetNumRetries ( ) const
   This method returns the number-of-retries value for the given policy.

const int GetTBR ( ) const
   This method returns the time-between-retries value for the given policy.

const ETomilAckType GetAckType ( ) const
   This method returns the type of acknowledgment specified for the given policy.

TomIL Address Components
   This section contains all the classes necessary to construct CTomilAddress objects. CTomilAddress objects are "generic" from an interface (i.e., external) point of view, but all addresses will contain a protocol-specific implementation (like e-mail, HTTP, FTP, etc.) These protocol-specific implementations are constructed through the factories that are part of this package. Each factory is specific to a protocol and that is where specialization occurs from a client perspective. For example, an e-mail specific factory would take one parameter: an e-mail address, whereas an HTTP-specific factory would take a URL for a parameter and possibly a proxy server address. For the first release of TOM/TomIL there will only be one address protocol: email.
Class-->CTomilAddressFactory This is the abstract base class from which all address factories derive. Even though users will not use this class directly, they will use the CreateAddress method via instantiations of the derived factories. Address factories are one of the mechanisms through which clients can create CTomilAddress objects.
Public Methods
virtual CTomilAddress* CreateAddressFromAB(const char* alias)=0;

This method allows clients to create well-constructed CTomilAddress objects from parameters gathered in the current TomIL address book under the alias specified by the "alias" parameter passed to this method. This method will be overridden in every derived factory to return a CTomilAddress object with a <protocol> specific implementation. For the first release of TomIL, the only value of <protocol> is email. This method will throw a CTomilError if the alias parameter is bad or no TomIL address book exists. Ownership of the memory attached to the returned pointer will belong to the client. Make sure to delete this memory when the pointer goes out of scope.
alias: a character string that identifies an entry in the current TomIL address book from which the CTomilAddress object will be created. See CTomilApplication::RestoreDefaultAddressBook( ) for the default location of the address book.
Class-->CTomilAddressFactoryEmail CTomilAddressFactoryEmail is a specific address factory whose instantiation enables clients to construct well-constructed CTomilAddress objects with implementations that are email specific.
Derived from CTomilAddressFactory
Public Methods
static CTomilAddressFactory* Instance( )

This is how clients create a CTomilAddressFactoryEmail object. This is the standard protocol for a singleton(127) object. The returned pointer by this method points to memory owned by TomIL. No client cleanup is necessary.
  Example:
CTomilAddressFactory*
  af=CTomilAddressFactoryEmail::Instance( );

address=af->CreateAddressFromAB("atl")

CTomilAddress* CreateAddressFromAB(const char* alias)
  Implementation of the base class method. See CTomilAddressFactory::CreateAddressFromAB( ) for details. This method will throw a CTomilError if alias is bad or no TomIL address book exists. Ownership of the memory attached to the returned pointer will belong to the client. Make sure to delete this memory when the pointer goes out of scope.

CTomilAddress* CreateEmailAddress(const char* actualAddress)

This method allows clients to construct well-constructed CTomilAddress object when they have an actual email address. It's important to note that just because a CTomilAddress object is constructed and returned, this makes no claims as to the validity of the email address from which it was constructed. Future releases may include actual runtime validation of email addresses. Ownership of the memory attached to the returned pointer will belong to the client. Make sure to delete this memory when the pointer goes out of scope.

actualAddress: A character string representing a valid email address. For example: "rcuser@atl.hp.com". Note, it is up to the client to make sure this is a valid email address as TomIL currently has no way to validate this.
Class-->CTomilAddress The CTomilAddress class is a "generic" address-wrapper which contains a protocol-specific implementation set via an address factory.
Public Methods
CTomilAddress* clone( ) const
  This method is how a client creates a deep copy of this object. For example:
CTomilAddress* add2=add1->clone( );

const char* GetAddressString( ) const
  This method returns a character representation of the address that was used according to the transport protocol chosen. Because protocols vary greatly, they require vastly different addresses to be realized. The string that this method's returned pointer points to should be used for informational/reporting/logging purposes only. There is no format guaranteed on this string, so clients that get in the habit of trying to parse it will be sorely disappointed! The returned pointer by this method points to memory owned by TomIL. No client cleanup is necessary.
Class-->CTomilAddressStrategy
  CTomilAddressStrategy is the base class from which all address strategy classes derive. Strategy objects in general encapsulate algorithms allowing them to vary independently from the clients that use them. An address strategy is an algorithm that computes the best possible address type for the client to use given the constraints passed to the strategy. For example, a client may want an extremely fast protocol for sending data and may not be concerned so much with reliability. The client would tell a particular address strategy to produce a "FAST" protocol for transporting data and then let the internal algorithms of that strategy compute which protocol would be fastest. Of course, this only makes sense if the strategy algorithm has more than one transport protocol from which to choose. For the first release of TomIL, there is only one protocol, namely email, but for future releases there will be multiple protocols. Introduction of strategy objects at this release is to simply familiarize clients with using them and get the clients used to letting TomIL make strategy decisions for them. The only strategy supported for the first release of TomIL is the "Specific Protocol" strategy described in the next section. It is fully functional.
Public Methods
CTomilAddressStrategy* clone( ) const
  This method is how a client creates a deep copy of this object. For example:
CTomilAddressStrategy* as2=as1->clone( );

virtual CTomilAddress* CreateAddress(const char* alias)
  In each class derived from CTomilAddressStrategy, this method will allow the client to construct a CTomilAddress object from the given alias. This method will throw a CTomilError if alias is bad or no TomIL address book exists. Ownership of the memory attached to the returned pointer will belong to the client. Make sure to delete this memory when the pointer goes out of scope.
alias: a character string that identifies an entry in the current TomIL address book from which the CTomilAddress object will be created. See CTomilApplication::RestoreDefaultAddressBook( ) for the default location of the address book.

Class-->CTomilAddressStrategy SpecificProtocol

CTomilAddressStrategy_SpecificProtocol is the first and most basic address strategy provided with TomIL. Please read the description of CTomilAddressStrategy before continuing here. A CTomilAddressStrategy_SpecificProtocol strategy is the simplest address strategy shipped with TomIL, and for the first release, the only address strategy. This strategy is constructed with a specific CTomilAddressFactory, like CTomilAddressFactoryEmail for instance. Once constructed, this strategy will return CTomilAddress objects via the CreateAddress( ) method. The CTomilAddress objects will be constructed according to the constraints of the specific address factory used. If no address factory is passed to the constructor of this strategy, then the default address factory: CTomilAddressFactoryEmail will be used. It may seem silly to have so many supporting objects in factories and strategies when the first release of TomIL only has one protocol: email. But it is imperative to get these objects into the library now so that clients can become familiar with this use model as future releases of TomIL will support multiple protocols.

Derived from CTomilAddressStrategy
Public Methods
static CTomilAddressStrategy_SpecificProtocol* Create (CTomilAddressFactory* factory=0)

This is how clients construct a CTomilAddressStrategy_SpecificProtocol object. If the "factory" parameter is not supplied it will default to CTomilAddressFactoryEmail. Ownership of the memory attached to the returned pointer will belong to the client. Make sure to delete this memory right before the pointer goes out of scope or a memory leak will be created.

CTomilAddress* CreateAddress(const char* alias)

This method will allow the client to construct a CTomilAddress object from the given alias. The CTomilAddress object will be created according to the factory used to construct this strategy object, or the CTomilAddressFactoryEmail factory if none was specified. This method will throw a CTomilError if alias is bad or no TomIL address book exists. Ownership of the memory attached to the returned pointer will belong to the client. Make sure to delete this memory when the pointer goes out of scope.

alias: a character string that identifies an entry in the current TomIL address book from which the CTomilAddress object will be created. See CTomilApplication::RestoreDefaultAddressBook( ) for the default location of the address book.

Example:

```
// Create a strategy for getting a CTomilAddress object.
CTomilAddressStrategy_SpecificProtocol* strategy;
strategy=CTomilAddressStrategy_SpecificProtocol::Create
   (CTomilAddressFactoryEmail::Instance( ));

CTomilAddress* address;

address=strategy->CreateAddress("atl");
// The above line invokes the CreateAddress( ) method on
   the "specific protocol"
// strategy. That method will use a CTomilAddressFactoryE-
   mail factory to look
// up the alias "atl" in the current TomIL address book and
   then retrieve the email
// specific address associated with "atl" and construct a
   CTomilAddress object
// using that address. If any errors are encountered in this
   process, a CTomilError
// object will be thrown.

delete strategy;
delete address;
```

TomIL Job Components

A Job represents all of the information necessary for a data transmission—what data to send, where to send it and by what protocol, and also all of the transmission policy parameters.

Class-->CTomilJob

The constructor for CTomilJob is protected to force instantiation through the static CTomilJob::Create( ) method.

Public Methods
static CTomilJob* Create (const CTomilAddress* address, const CTomilPolicy* policy)

This is how clients create a CTomilJob object. If either parameter is NULL, a CTomilError will be thrown. Ownership of the memory attached to the returned pointer will belong to the client. Make sure to delete this memory right before the pointer goes out of scope or a memory leak will be created.

CTomilJob* clone( ) const

This method is how a client creates a deep copy of this object. For example: CTomilJob* job2=job1->clone( );

enum ETomilDirStructure {TOMIL_FLAT_FILE, TOMIL_FULL_DIRECTORY};

void AddFile (const char* filename, const EtomilDirStructure ds=TOMIL_FULL_DIRECTORY)

The AddFile methods adds a filename to an internal filename list for a given job. The filename will be validated at this point to make sure that it exists, is readable, etc. If the file is invalid, a CTomilError will be thrown. The following are restrictions on the file paths passed to AddFile( ). Violation of any of these restrictions will cause a CTomilError object to be thrown.

Path names to files must be absolute. For HP-UX, this means the pathname to the file must begin with a '/'. UNC names are not allowed in release 1.

Any file added to a CTomilJob using AddFile( ) must exist at the time it is added.

The basename of all files added in conjunction with the TOMIL_FLAT_FILE flag set must be unique. For example, adding /usr/tmp/foo and /etc/foo, each with the TOMIL_FLAT_FILE flag set will cause an error to be thrown. This is because the TOMIL_FLAT_FILE flag causes all files to be laid down on the receiving system using only the file's basename. In this case, /usr/tmp/foo would be delivered as "foo", and then /etc/foo would overwrite "foo" as it was delivered.

ds: A variable that allows the client application to specify how files will be treated on the receiving end when they are put into the receiver's file structure. If TOMIL_FULL_DIRECTORY (the default) is used, files will be put into the receiving file structure according to their full path name (i.e., the file "/usr/lib/foo" would be put into /OUTBOX/<application_name>/<transaction_id>/usr/lib/foo).

If TOMIL_FLAT_FILE is used, then there is no directory structure constructed on the receiving side (i.e., the file "/usr/lib/foo" would be put into /OUTBOX/<application_name>/<transaction_id>/foo).

Note: If using this value, clients must NOT construct a job with files which have the same basename, like /usr/lib/foo and /usr/etc/foo. This would cause /usr/lib/foo to be put on the receiver under the name "foo" and then it would be overwritten with /usr/etc/foo. Because this situation causes loss of data, it will be prohibited and a CTomilError will be thrown to the client app if this is detected.

fileName: a character string representing an absolute path to a specific data file. No wildcarding is allowed. No regular expressions are allowed. Note: for NT systems, a volume label must be included (i.e., C:\temp\foo rather than \temp\foo).

Class-->CTomilTransactionID

A CTomilTransactionID object is an object by which any particular job can be identified. Any time a job is transmitted to a destination, a CTomilTransactionID object is returned for that job. (No objects will be returned if TOM re-transmits a job as re-transmission is all under the control of TOM and is completely divorced from TomIL. No matter how many times a job has to be re-transmitted, the initial CTomilTransactionID object will always identify the given transaction.) A CTomilTransactionID object contains a GUID that is guaranteed to be unique across the computing universe.

Public Methods static CTomilTransactionID* Create(const char* guid)

Internal users as well as external clients may both want to create a CTomilTransactionID object by passing a GUID string parameter into it. A client may want to do this when bringing a GUID into memory from disk and then using that GUID to construct a CTomilTransactionID object that can be passed to one of the methods of CTomilCourier. Ownership of the memory attached to the returned pointer will belong to the client. Make sure to delete this memory right before the pointer goes out of scope or a memory leak will be created.

CTomilTransactionID* clone( ) const

This method is how a client creates a deep copy of this object. For example: CTomilTransactionID* tid2=tid1->clone( );

const CTomilTransactionID& operator=(const char* rhs)

Assignment operator that lets char*'s be assigned directly to CTomilTransactionID objects. For example: *tid="guid-identifier-character-string"; // Note the * to de-reference the pointer.

const int operator==(const CTomilTransactionID& rhs)

Standard comparison operator.

const int operator!=(const CTomilTransactionID& rhs)

Standard not-comparison operator.

const char* GetID ( ) const

This method simply returns the character string representation of a CTomilTransactionID. This representation will be a GUID. This representation will be "unknown" if the CTomilTransactionID object was constructed with a char* that is 0. The returned pointer by this method points to memory owned by TomIL. No client cleanup is necessary.

Class->CTomilTransactionIDIterator

This class is an iterator that allows clients to get access to all CTomilTransactionID's associated with a particular application interfacing with TOM via TomIL. The only way a valid CTomilTransactionIDIterator object can be created is via a call to CTomilCourier::GetAllIDs( ) or via a call to clone( ) on an already valid CTomilTransactionIDIterator object.

Public Methods

There is no way to create a valid CTomilTransactionIDIterator object except through a call to CTomilCourier::GetAllIDs( ) or a call to clone( ) on an already valid object.

CTomilTransactionIDIterator* clone( ) const

This method is how a client creates a deep copy of this object. For example: CTomilTransactionIDIterator* IDIt2=IDIt1->clone( );

void Reset( ) const

This method will reset an internal pointer to the first TransactionID in the list. This method should always be called before any attempt to traverse a list of TransactionIDs.

CTomilTransactionID* Next ( )

This method will advance an internal pointer to the next CTomilTransactionID in the list and return a pointer to that object. The returned pointer by this method points to memory owned by TomIL. No client cleanup is necessary.

Code example using a CTomilTransactionIDIterator:

```
CTomilCourier* courier=CTomilCourier::Instance( );
CTomilTransactionIDIterator* IDIt=0;
CTomilTransactionStatus* status=0;
CTomilTransactionID* tid;

IDIt=courier->GetAllIDs( );
IDIt->Reset( );

while(tid=IDIt->Next( ))
{
delete status;
status=courier->Query(tid );
}// for delete IDIt;
delete status;
```

Class-->CTomilTransactionStatus

A CTomilTransactionStatus object contains the status of any particular job that has been transmitted. Once you have a CTomilTransactionStatus object, you can query all the properties of the transaction associated with the CTomilTransactionID object that was passed to CTomilCourier using the myriad of Get*( ) methods described below. The only way a valid CTomilTransactionStatus object can be created is via a call to CTomilCourier::Query( ) or via a call to clone( ) on an already valid CTomilTransactionStatus object.

enum ETomilTransactionStatusType
{
TOMIL_TRANSACTION_UNKNOWN, // initial state: should NEVER occur.
TOMIL_TRANSACTION_PENDING,
TOMIL_TRANSACTION_TIMED_OUT,
TOMIL_TRANSACTION_COMPLETED, TOMIL_TRANSACTION_COMPLETED_WITH_
   EXCEPTION,
TOMIL_TRANSACTION_SEND_EXCEPTION
}

Those skilled in the art will recognize that an object may be used for this purpose as distinct from a simple enum data type. An enum type is believed to be sufficient in this situation particularly in view of the "optional string" parameter which can be used to exchange information specific to a status.

A convenience streaming operator is provided for the CTomilTransactionStatus class.

friend class ostream & operator<<(ostream & o, CTomil-TransactionStatus* ts);
Public Methods The only way a valid CTomilTransactionStatus object can be created is via a call to CTomilCourier::Query( ) or via a call to clone( ) on an already valid CTomilTransactionStatus object.

Example of how to get a CTomilTransactionStatus object:
CTomilTransactionStatus* status;
status Courier->Query(TransactionID);
switch (status->GetStatus( ))
{
   case TOMIL_TRANSACTION_PENDING: // do whatever
      break;
   // etc...
}
delete status;

const ETomilTransactionStatusType GetStatus ( ) const
   This method will return the status that's been assigned to a particular CTomilTransactionStatus object. The status returned will be an enumerated type from the list ETomilTransactionStatusType. For all CTomilTransactionStatus objects that have been created with invalid CTomilTransactionID objects, this method will return the value TOMIL_TRANSACTION_UNKNOWN.

const char* GetReturnedString ( ) const
   This method will return a pointer to the string that was returned from the process that received the job that was sent. This "returned string" is an optional string that allows receiving applications to communicate other status information back to the sending application. The returned pointer by this method points to memory owned by TomIL. No client cleanup is necessary.
   When a CTomilTransactionStatus object is initially created, this string is " " and it will only change if the receiving application had used it to return extra status information to the sending application.

const char* GetAppName ( ) const
   This method returns the character string representing the application name associated with the given CTomilTransactionID object. If an invalid CTomilTransactionID object was used to create the given CTomilTransactionStatus object, this method will return the same value as the static method: GetUnknownS( ). Return values from this method should always be checked against GetUnknownS( ). The returned pointer by this method points to memory owned by TomIL. No client cleanup is necessary.

const char* GetAppVer ( ) const
   This method returns the character string representing the application version associated with the given CTomilTransactionID object. If an invalid CTomilTransactionID object was used to create the given CTomilTransactionStatus object, this method will return the same value as the static method: GetUnknownS( ). Return values from this method should always be checked against GetUnknownS( ). The returned pointer by this method points to memory owned by TomIL. No client cleanup is necessary.

const char* GetAppID ( ) const
   This method returns the character string representing the application identifier associated with the given CTomilTransactionID object. If an invalid CTomilTransactionID object was used to create the given CTomilTransactionStatus object, this method will return the same value as the static method: GetUnknownS( ). Return values from this method should always be checked against GetUnknownS( ). The returned pointer by this method points to memory owned by TomIL. No client cleanup is necessary.

const time_t GetTimeSent ( ) const
   This method returns the time_t value (as defined in time.h) representing the time the job was sent which is associated with the given CTomilTransactionID object. If an invalid CTomilTransactionID object was used to create the given CTomilTransactionStatus object, this method will return 0. Return values from this method should always be checked against 0. The return value is specified in UCT: Universal Coordinated Time and should be adjusted by each client for local time.

const ETomilAddressType GetProtocol ( ) const
   This method returns the character enumerated type representing the transport protocol used to send the job associated with the given CTomilTransactionID object. If an invalid CTomilTransactionID object was used to create the given CTomilTransactionStatus object, this method will return TOMIL_ADDRESSTYPE_UNKNOWN. Return values from this method should always be checked against TOMIL_ADDRESSTYPE_UNKNOWN. For the first release of TomIL, valid values will always be: TOMIL_EMAIL.

CTomilPolicy* CreatePolicy(void) const
   This method returns a new CTomilPolicy object constructed with the values that were used to create the transaction for which this status object refers. See the section on CTomilPolicy for a description of the methods that can be used to retrieve CTomilPolicy values. Make sure to ALWAYS check this returned pointer for NULL before trying to access any methods of the CTomilPolicy object. This will prevent possible access violations if the policy parameters for this TransactionID were not set for some reason. Ownership of the memory attached to the returned pointer will belong to the client. Make sure to delete this memory when the pointer goes out of scope.

const int GetCurrentTry ( ) const
   This method returns the integer representing the current try (i.e., how many times has this job been sent) value associated with the given CTomilTransactionID object. If an invalid CTomilTransactionID object was used to create the given CTomilTransactionStatus object, this method will return the same value as the static method: GetUnknownI( ). Return values from this method should always be checked against GetUnknownI( ).

const char* GetDestinationAddress ( ) const

This method returns the character string representing the destination address associated with the given CTomilTransactionID object. There is no format guaranteed on the string returned by this method as it can vary widely between transport protocols. If an invalid CTomilTransactionID object was used to create the given CTomilTransactionStatus object, this method will return the same value as the static method: GetUnknownS( ). Return values from this method should always be checked against GetUnknownS( ). The returned pointer by this method points to memory owned by TomIL. No client cleanup is necessary.

const char* GetDestinationAddressAlias ( ) const

This method returns the character string representing the destination address alias (i.e., The identifier used to retrieve an address from an address book) associated with the given CTomilTransactionID object. If an invalid CTomilTransactionID object was used to create the given CTomilTransactionStatus object, this method will return the same value as the static method: GetUnknownS( ). Return values from this method should always be checked against GetUnknownS( ). The returned pointer by this method points to memory owned by TomIL. No client cleanup is necessary.

static const char* GetUnknownS ( )

This method returns the character string used for the internal representation of "unknown" for character strings that are returned by the Get*( ) methods listed above. It is a best practice to always compare any returned string from a Get*( ) method with this value to make sure the returned value is valid. The returned pointer by this method points to memory owned by TomIL. No client cleanup is necessary.

static const int GetUnknownI ( )

This method returns the integer used for the internal representation of "unknown" for integers that are returned by the Get*( ) methods listed above. It is a best practice to always compare any returned integer from a Get*( ) method with this value to make sure the returned value is valid.

TomIL Courier

The TomIL Courier is the portal into the transport office. Client applications create and setup jobs and then pass them into the Send( ) method to be transported via the transport office to their final destination. After sending a package, client applications may asynchronously check the status of a transmission (i.e., if it has been acknowledged yet) by using the Query( ) method of CTomilCourier.
Class-->CTomilCourier The constructor for CTomilCourier is protected to force instantiation through the static CTomilCourier::Instance( ) method. Think of the CTomilCourier object as the local mailman. A CTomilCourier object handles all communication between an application and TOM. The information that was registered regarding the client application (using CTomilApplication::Register( )) will be sent to TOM with every transaction initiated by a CTomilCourier.

Once the CTomilCourier::Send( ) method returns, changes made to the job object that it was given will NOT affect that particular transmission. If this behavior is desired, another call to CTomilCourier::Send( ) must be made.
Public Methods
static CTomilCourier* Instance ( )

This method is how a client creates a CTomilCourier object. This is standard protocol for a Singleton(127) object.

For example:

CTomilCourier* courier=CTomilCourier::Instance( );

CTomilTransactionID* Send (const CTomilJob* job, const CTomilApplication* app) const This method is the actual communication link between a client and the TOM process running on the client's machine. This method will transmit a CTomilJob to TOM for processing. This method can throw CTomilError objects if: communications can not be established with TOM, if either parameter is NULL, or if no files were added to the CTomilJob object passed to this method.

NOTE: This method (Send( )) does NOT block waiting for a job to be sent. It simply streams all data necessary to send a job to TOM and then immediately returns. This method is client-side specific.

This method returns a new CTomilTransactionID object which is unique to this transaction. The GUID portion of the CTomilTransactionID object must be saved in persistent storage by the client application if it wishes to query the status of the transaction after the CTomilTransactionID goes out of scope. Ownership of the memory attached to the returned pointer will belong to the client. Make sure to delete this memory when the pointer goes out of scope.

void Purge (const CTomilTransactionID* TransactionID) const

The Purge( ) method takes a CTomilTransactionID object pointer as a parameter and then removes all references to the CTomilJob object referred to by the given CTomilTransactionID from the TOM persistent and temporary storage. Any future transmissions regarding this CTomilJob are discarded. This method will throw a CTomilError object if communications can not be established with TOM or if the parameter passed in is NULL. This method is client-side specific. This method does NOT affect any processing of the job that may be active on the receiving machine.

CTomilTransactionStatus* Query
 (const CTomilTransactionID* TransactionID, const ETomilQueryType Type=TOMIL_NON_DESTRUCTIVE_READ) const This method takes a CTomilTransactionID object pointer and a query type as parameters and returns a new CTomilTransactionStatus object which contains status information regarding the CTomilJob referred to by the given CTomilTransactionID object. The second parameter, Type, specifies what type of read the query is to do. The default, TOMIL_NON_DESTRUCTIVE_READ, forces TOM to not cleanup the transaction after the transaction is complete and the client has been notified through this method, thus transferring the burden of purging the transaction back to the client code. The other option, TOMIL_DESTRUCTIVE_READ, lets TOM automatically cleanup a transaction after it has completed and the client has queried it so it knows the transaction is complete. This method will throw a CTomilError object if communications can not be established with TOM or if the transactionID is null. This method is client-side specific. Ownership of the memory attached to the returned pointer will belong to the client. Make sure to delete this memory when the pointer goes out of scope.

enum ETomilQueryType={
 TOMIL_NON_DESTRUCTIVE_READ,
 TOMIL_DESTRUCTIVE_READ}

CTomilTransactionIDIterator* GetAllIds (const CTomilApplication* app) const

This method will return a new CTomilTransactionIDIterator object which allows iteration over all CTomilTransactionID's that are valid for the client's particular application specified by the app parameter. This iterator can be useful for state recovery of an application should it die and then be restarted. The client can get a copy of a CTomilTransactionIDIterator from GetAllIDs( ) and then re-Query( ) the status of all its jobs which are still active in the TOM. This method will throw a CTomilError object if communications can not be established with TOM or if the app parameter is NULL. This method is client-side specific. Ownership of the memory attached to the returned pointer will belong to the client. Make sure to delete this memory when the pointer goes out of scope.

void Ack (const CTomilTransactionID* TransactionID, const char* message=0) const This method transmits an acknowledgment to the process that originally sent the CTomilJob referred to by the CTomilTransactionID passed in. An optional "status" string may be included with the acknowledgment. This status string will be a 255 (or less) character string. This method will throw a CTomilError object if communications can not be established with TOM or if the transactionID is NULL. This method is server-side specific.

void PartialAck (const CTomilTransactionID* TransactionID, const char* message=0) const This method provides a means to send progress reports about a job from the server application to the client application. PartialAck( ) transmits a partial acknowledgment to the process that originally sent the CTomilJob referred to by the CTomilTransactionID passed in. An optional "status" string may be included with the acknowledgment. This status string will be a 255 (or less) character string. This method will throw a CTomilError object if communications can not be established with TOM or if the transactionID is NULL. This method is server-side specific.

A partial acknowledgment differs from a full acknowledgment in that the job on the sending end will not be marked as "complete" upon receipt of a partial acknowledgment.

TomIL Error

This section contains the CTomilError class. CTomilError objects can be thrown throughout TomIL.
Class-->CTomilError This class represents CTomilError objects. CTomilError objects contain an error code and error text representing internal TomIL errors. These objects can be thrown from methods within the TomIL library of objects. It is necessary that clients catch these objects by pointer.

For example:

try {
}
catch(CTomilError* e)
{
  // Process the error
  delete e;
}

A convenience streaming operator has been provided for errors. friend class ostream & operator<<(ostream & o, CTomilError* e);

Public Methods

There is no way to create a CTomilError other than to catch one via a "catch" statement or to use the clone( ) method on an already created CTomilError object.

CTomilError* clone( ) const

This method is how a client creates a deep copy of this object. For example: CTomilError* err2=err1->clone( );

const int Errno ( ) const

This method will return the error number of a particular CTomilError object.

const char* ErrString ( ) const

This method will return a pointer to a string that contains the text associated with a particular CTomilError object. The text for all possible CTomilError's will be stored in a TomIL message file. This message file can be localized once it's at a customer's site. The location of all TomIL message files is: /opt/TOM/lib/TomIL.mes on HP-UX, and c:\Tom\lib\TomIL.mes on NT. The returned pointer by this method points to memory owned by TomIL. No client cleanup is necessary.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. A system for managing exchange of data between secured computing systems comprising:
   a transmission manager operable in a first computing system to manage failure processing in the exchange of said data;
   a reception manager operable in a second computing system operable in conjunction with said transmission manager to receive said data from said transmission manager and to manage failure processing in the exchange of said data;
   a communication medium usable by said transmission manager and by said reception manager, wherein said transmission manager utilizes transmission protocols over said communication medium capable of communicating between said secured computing systems;
   a transmit job database associated with said transmission manager for retaining information regarding an information exchange between said transmission manager and said reception manager; and
   a receive job database associated with said reception manager for retaining information regarding an information exchange between said transmission manager and said reception manager.

2. The system of claim 1 wherein said transmission manager includes:
   a failure monitor to detect failure in exchange of said data between said transmission manager and said reception manager; and
   a retransmitter, responsive to said failure monitor, to retransmit said data to said reception manager in response to detection of said failure in exchange of said data.

3. The system of claim 2 wherein said transmit job database includes timeout information indicative of a maximum time for expected completion of said exchange of data, and wherein said failure monitor includes a timeout detector to detect failure of said exchange of data by time of said exchange of data exceeding said maximum expected time.

4. The system of claim 1 wherein said transmission manager includes:

an acknowledge receptor for receiving acknowledgment from said reception manager of successful transmission of said exchange of data.

5. The system of claim 1 wherein said secured computing systems are secured by firewalls.

6. The system of claim 5 wherein said protocols include network protocols permitted to pass through said firewalls.

7. The system of claim 6 wherein said network protocols include an email protocol.

8. The system of claim 6 wherein said network protocols include a hypertext transfer protocol.

9. The system of claim 5 wherein said communication medium comprises a manual exchange medium, and wherein said protocols include manual transfer protocol.

10. The system of claim 9 wherein said manual exchange medium comprises a magnetic medium movable between said secured computing systems.

11. The system of claim 5 wherein said communication medium comprises connected modems associated with each of said secured computing systems, and wherein said protocols include file transfer protocols operable on said connected modems.

12. The system of claim 1 wherein said reception manager includes:

an acknowledgment transmitter, responsive to receipt of said exchange of data, to transmit an acknowledgment to said transmission manager.

13. The system of claim 1 wherein said data transmitted from said transmission manager includes indicia of an originating process of said data, and where said receive job database includes:

an application mapping file indicative of an intended destination process associated with said originating process.

14. The system of claim 13 wherein said reception manager includes:

a destination process originator for starting said intended destination process in response to receipt of said data; and means for forwarding the received data to said destination process.

15. A method for exchanging data between secured computing systems comprising the steps of:

receiving a request to transmit data from an originating process in a first system of said secured computing systems;

storing job information regarding said request to transmit data in a transmit job database within said first system;

transferring said data from said first system to a second system of said secured computing systems using a communication medium capable of communicating between said secured computing systems; and assuring, by operation of said first system, successful transfer of said data without loss of said data using said job information in said transmit job database.

16. The method of claim 15 wherein the step of assuring successful transfer comprises a step of:

determining that the transfer succeeded in response to receipt within said first system of an acknowledgment from said second system.

17. The method of claim 16 wherein said transmit job database includes timeout information indicative of a maximum time for completion of said transfer, and wherein the step of assuring successful transfer further comprises steps of:

determining that the transfer failed in response to expiration of said maximum time without receipt of said acknowledgment; and retransmitting said data in response to a determination that said transfer failed.

18. The method of claim 15 wherein said secured computing systems are secured by firewalls.

19. The method of claim 18 wherein said communication medium comprises a computer network and wherein the step of transferring includes a step of:

transferring said data using a network protocol permitted to pass through said firewalls.

20. The method of claim 19 wherein the step of transferring using a network protocol includes a step of:

transferring said data using an email protocol.

21. The method of claim 19 wherein said network protocols include a hypertext transfer protocol.

22. The method of claim 18 wherein said communication medium comprises a manual exchange medium.

23. The method of claim 22 wherein said manual exchange medium comprises a magnetic medium movable between said secured computing systems and wherein the step of transferring includes a step of:

manually transferring said data between said secured computing systems via said magnetic medium.

24. The method of claim 18 wherein said communication medium comprises connected modems associated with each of said secured computing systems and wherein the step of transferring includes a step of:

transferring said data using file transfer protocols operable on said connected modems.

25. The method of claim 15 further comprising a step of:

transmitting an acknowledgment from said second system to said first system in response to receipt of said data.

26. The method of claim 15 wherein the step of transferring said data includes a step of transferring indicia of said originating process.

27. The method of claim 26 further comprising a step of:

locating information corresponding to said indicia of said originating process in a receive job database associated with said second system, said information including indicia of a destination process for processing of said data.

28. The method of claim 27 further comprising steps of:

initiating said destination process in response to receipt of said data; and forwarding the received data to said destination process.

* * * * *

UNITED STATES PATENT AND TRADEMARK OFFICE
CERTIFICATE OF CORRECTION

PATENT NO.    : 6,192,410 B1                                                Page 1 of 1
DATED         : February 20, 2001
INVENTOR(S)   : Christopher S. Miller et al.

It is certified that error appears in the above-identified patent and that said Letters Patent is hereby corrected as shown below:

Column 4,
Line 65, delete "blocks" and insert therefor -- block --

Column 5,
Line 1, delete "blocks" and insert therefor -- block --

Column 6,
Line 57, after "robust" insert -- , --

Column 16,
Line 57, after "remain in" insert -- the job database for a period of time following completion to permit "off-line" statistical --

Column 19,
Line 1, delete "Element" and insert therefor -- Elements --

Signed and Sealed this

Thirty-first Day of December, 2002

JAMES E. ROGAN
*Director of the United States Patent and Trademark Office*